US012143905B2

(12) United States Patent
el Essaili et al.

(10) Patent No.: US 12,143,905 B2
(45) Date of Patent: *Nov. 12, 2024

(54) METHOD, APPARATUS, AND COMPUTER-READABLE MEDIUM FOR INTELLIGENT TRANSPORTATION SYSTEM (ITS) MESSAGE DISTRIBUTION

(71) Applicant: Telefonaktiebolaget LM Ericsson (publ), Stockholm (SE)

(72) Inventors: Ali el Essaili, Aachen (DE); Thorsten Lohmar, Aachen (DE); Yunpeng Zang, Wuerselen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 219 days.

This patent is subject to a terminal disclaimer.

(21) Appl. No.: 17/236,153

(22) Filed: Apr. 21, 2021

(65) Prior Publication Data
US 2021/0243577 A1 Aug. 5, 2021

Related U.S. Application Data

(63) Continuation of application No. 16/321,856, filed as application No. PCT/EP2018/082960 on Nov. 29, 2018, now Pat. No. 11,012,834.

(Continued)

(51) Int. Cl.
H04W 4/40 (2018.01)
H04W 4/021 (2018.01)
(Continued)

(52) U.S. Cl.
CPC ............ H04W 4/40 (2018.02); H04W 4/021 (2013.01); H04W 60/06 (2013.01); H04W 64/003 (2013.01)

(58) Field of Classification Search
None
See application file for complete search history.

(56) References Cited

U.S. PATENT DOCUMENTS 10,506,394 B2   12/2019   Chun et al.
11,012,834 B2*  5/2021   el Essaili ............... H04W 4/44
(Continued)

FOREIGN PATENT DOCUMENTS

CO   2021011559 A2   9/2021
RU      2599953 C2   10/2016
(Continued)

OTHER PUBLICATIONS

"3GPP TR 23.795 V0.2.0", 3rd Generation Partnership Project; Technical Specification Group Services and System Aspects; Study on application layer support for V2X services; (Release 16), Mar. 2018, pp. 1-29.

(Continued)

Primary Examiner — Phirin Sam
(74) Attorney, Agent, or Firm — Murphy, Bilak & Homiller, PLLC

(57) ABSTRACT

Embodiments include methods performed by a V2X application enabler (VAE) client, of a V2X User Equipment (UE) arranged for communication with a VAE server. Such methods include sending, to the VAE server, a first request for registration or de-registration to receive intelligent transportation system (ITS) messages associated with at least one of the following: a first V2X service, when an identifier of the first V2X service is included in the first request; and a first geographic area, when an identifier of the first geographic area is included in the first request. Such methods also include receiving, from the VAE server, a first response comprising an acknowledgement of the first request for registration or de-registration. Embodiments also include complementary methods and/or procedures performed by (Continued)

VAE servers, as well as V2X UEs, VAE servers, and computer-readable media configured in accordance with the exemplary methods and/or procedures.

20 Claims, 12 Drawing Sheets

Related U.S. Application Data

(60) Provisional application No. 62/742,653, filed on Oct. 8, 2018.

(51) Int. Cl.
*H04W 60/06* (2009.01)
*H04W 64/00* (2009.01)

(56) References Cited

U.S. PATENT DOCUMENTS

| | | |
|---|---|---|
| 2009/0037496 A1 | 2/2009 | Chong et al. |
| 2015/0373528 A1 | 12/2015 | Iwai |
| 2017/0288886 A1* | 10/2017 | Atarius ............... H04L 47/20 |
| 2017/0289098 A1* | 10/2017 | Chun ............... H04L 61/103 |
| 2018/0005254 A1* | 1/2018 | Bai ............... B60W 10/00 |
| 2018/0049088 A1 | 2/2018 | Shiga et al. |
| 2018/0049235 A1 | 2/2018 | Baghel et al. |
| 2018/0206089 A1* | 7/2018 | Cavalcanti ............ H04W 48/16 |
| 2018/0242190 A1* | 8/2018 | Khoryaev ............... H04L 47/32 |
| 2019/0120649 A1 | 4/2019 | Seok et al. |
| 2019/0124489 A1 | 4/2019 | Ahmad et al. |
| 2019/0132740 A1 | 5/2019 | De et al. |
| 2019/0289459 A1* | 9/2019 | Shan ............... H04W 76/25 |
| 2019/0313469 A1* | 10/2019 | Karampatsis ......... H04W 76/14 |
| 2019/0364402 A1 | 11/2019 | Lee |
| 2020/0178123 A1* | 6/2020 | Shan ............... H04W 36/0016 |
| 2020/0213921 A1 | 7/2020 | Song et al. |
| 2020/0260214 A1* | 8/2020 | Wu ............... H04W 4/40 |
| 2020/0267517 A1 | 8/2020 | El Essaili et al. |
| 2020/0344709 A1* | 10/2020 | Khoryaev ............ H04B 7/2684 |
| 2021/0274387 A1* | 9/2021 | Kousaridas ........... H04W 28/24 |
| 2021/0314899 A1 | 10/2021 | Shan et al. |
| 2022/0286928 A1* | 9/2022 | Karampatsis ............ H04W 4/40 |
| 2022/0408354 A1* | 12/2022 | Kedalagudde ...... H04L 43/0841 |
| 2023/0063242 A1* | 3/2023 | Shan ....................... H04W 4/24 |

FOREIGN PATENT DOCUMENTS

| | | |
|---|---|---|
| WO | 2017173072 A1 | 10/2017 |
| WO | 2018093220 A1 | 5/2018 |

OTHER PUBLICATIONS

"3GPP TS 23.286 V0.1.0", 3rd Generation Partnership Project; Technical Specification Group Services and System Aspects; Application layer support for V2X services; Functional architecture and information flows; (Release 16), Oct. 2018, pp. 1-28.
"3GPP TR 23.795 V16.0.0", 3rd Generation Partnership Project; Technical Specification Group Services and System Aspects; Study on application layer support for V2X services; (Release 16), Sep. 2018, pp. 1-77.
"3GPP TS 23.285 V15.1.0", 3rd Generation Partnership Project; Technical Specification Group Services and System Aspects; Architecture enhancements for V2X services (Release 15), Jun. 2018, pp. 1-36.
"3GPP TS 26.348 V1.0.0", 3rd Generation Partnership Project; Technical Specification Group Services and System Aspects; Northbound Application Programming Interface (API) for Multimedia Broadcast/Multicast Service (MBMS) at the xMB reference point (Release 16), Sep. 2018, pp. 1-40.

\* cited by examiner

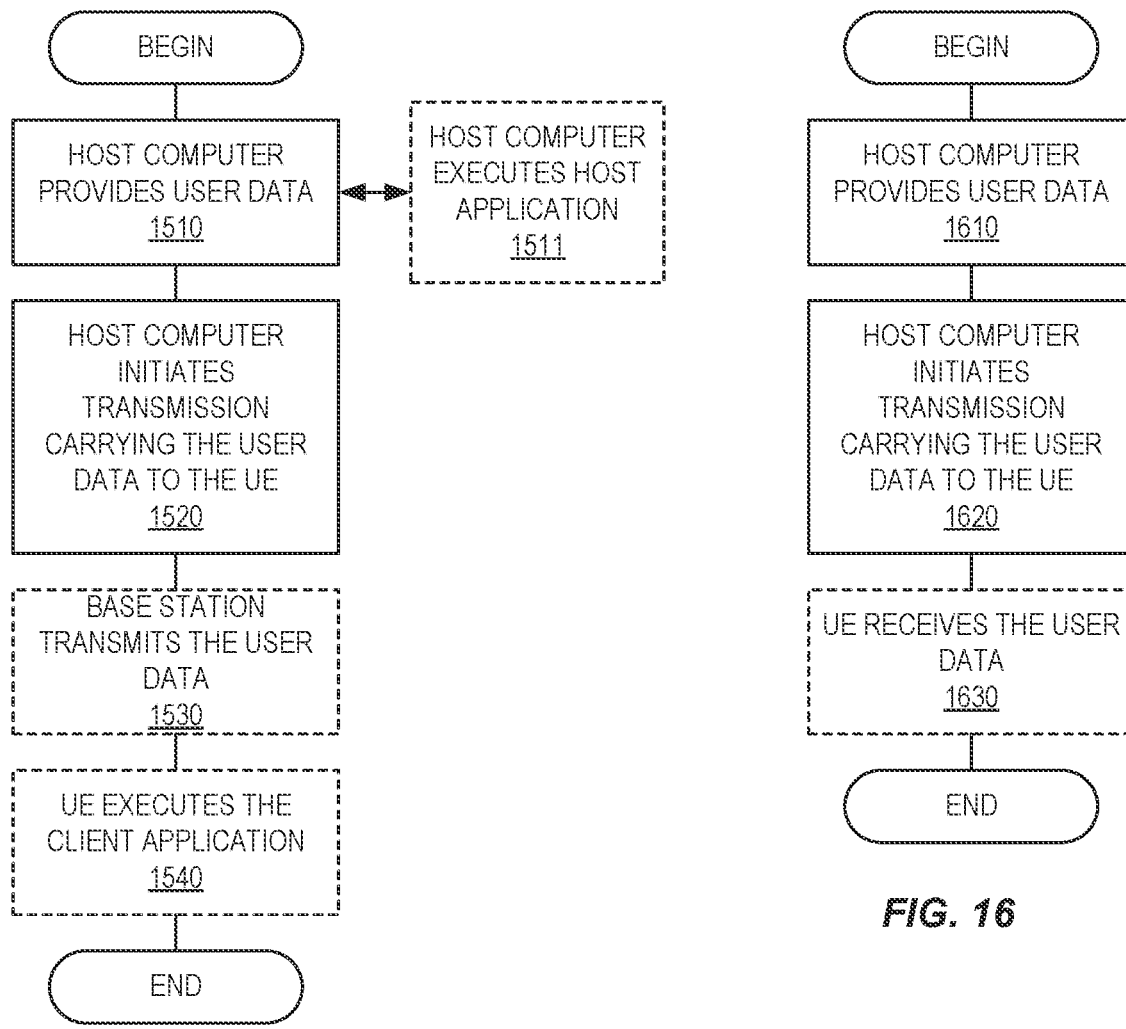

METHOD, APPARATUS, AND COMPUTER-READABLE MEDIUM FOR INTELLIGENT TRANSPORTATION SYSTEM (ITS) MESSAGE DISTRIBUTION

RELATED APPLICATIONS

This application is a continuation of, and claims the benefit of priority from, U.S. application Ser. No. 16/321,856 filed on Jan. 30, 2019, which is a national-stage application claiming priority to international application PCT/EP2018/082960 filed on Nov. 29, 2018, which claims the benefit of U.S. Prov. Appl. No. 62/742,653 filed on Oct. 8, 2018. The entire disclosures of the above-mentioned applications are incorporated herein by reference for all purposes.

TECHNICAL FIELD

The present application relates generally to the field of wireless communications, and more specifically to distribution of messages in an intelligent transportation system (ITS) to users in particular geographical area.

DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Cellular communication systems are currently being developed and improved for Intelligent Transportation Systems (ITS) applications, including road transport. Communication of vehicles with each other (vehicle-to-vehicle, or V2V), with infrastructure (V2I), and with vulnerable road users are expected to increase user safety and comfort, and to improve traffic management and/or reduce congestion, and to reduce vehicle fuel consumption and emissions. Collectively, these communication modes are commonly referred to as vehicle to everything (V2X). An extensive set of ITS-related use cases for V2X have been developed, and, based on these use cases, V2X communication requirements have been developed.

Within these use cases, the end-user communication equipment is commonly referred to as a user equipment (more specifically, V2X UE), and the entity serving an application associated with a user case is commonly referred to as an application server (more specifically, V2X AS). For example, FIG. 1 shows a simplified architectural model for the V2X application layer as specified in 3GPP Technical Standard (TS) 23.285. In the figure, the V2X UE1 communicates with V2X application server (AS) over V1 reference point, and the V2X UE1 and UE2 communicate over V5 reference point. In addition, V2X UE1 can act as a UE-to-network relay thereby enabling V2X UE2 to access the V2X application server over V1 reference point.

Furthermore, reference point V1 supports the V2X application-related interactions between V2X UE and V2X AS and is further specified in 3GPP TS 23.285. This reference point is supported for both unicast and multicast delivery modes. Likewise, reference point V5 supports the interactions between the V2X UEs and is also specified in 3GPP TS 23.285.

FIG. 2 shows a more detailed V2X application layer functional model. As compared to the architectural model shown in FIG. 1, the model shown in FIG. 2 specifies the functional entities at the V2X application layer. For example, the V2X application server (AS) consists of V2X application enabler (VAE) server (as discussed, e.g., in 3GPP Technical Report (TR) 23.795) and the V2X application-specific server. The VAE server provides the V2X application layer support functions to the V2X application specific server over Vs reference point.

Similarly, each of the V2X UEs include a VAE client and a V2X application-specific client. The VAE client provides the V2X application layer support functions to the V2X application specific-client over Vc reference point. The VAE client of V2X UE1 communicates with the VAE server over V1-AE reference point, and the V2X application-specific client of V2X UE1 communicates with V2X application-specific server over V1-APP reference point. Similarly, the VAE client of V2X UE2 communicates with the VAE client of V2X UE2 over V5-AE reference point, and the V2X application-specific client of V2X UE2 communicates with the V2X application-specific client of V2X UE2 over V5-APP reference point. As discussed above, V2X UE1 can also act as a UE-to-network relay for V2X UE2, enabling the clients comprising V2X UE1 to access the V2X AS over the respective V1 reference points.

The VAE server interacts with 3GPP networks (e.g., Evovled Packet Subsystem (EPS) and/or 5G subsystem (5GS)) via the V2, MB2, xMB, Rx, T8, Npcf, and/or N33 reference points. A message on the V1-AE interface can be sent as unicast, transparent multicast via xMB, or transparent multicast via MB2. The non-transparent multicast via xMB (as specified in 3GPP TS 26.348) is triggered by a V1-AE message. Multicast distribution can be in either transparent or non-transparent mode.

V2X UEs register for certain ITS messages and report geographical area information to the V2X AS. Even so, the information flows between the V2X UEs and V2X AS are currently undefined. Furthermore, procedures for using the information flow messages to deliver ITS messages to registered V2X UEs in targeted geographical locations are also undefined.

SUMMARY

Exemplary embodiments of the present disclosure include methods and/or procedures performed by a V2X application enabler (VAE) client in communication with a VAE server. The VAE client can be part of a V2X user equipment (UE), such as a wireless device. The exemplary methods and/or procedures can include sending, to the VAE server, a first message comprising an identifier of the V2X UE and at least one of the following: identifiers of one or more first types of intelligent transportation system (ITS) messages, from the VAE server, to which the V2X UE wishes to register or unregister for receiving; and an identifier of a first geographic area that V2X UE wishes to register or unregister for association with the V2X UE at the VAE server. In some exemplary embodiments, the first message comprises the identifier of the first geographic area and identifiers of the first types of ITS messages that the V2X UE wishes to register for receiving with respect to the first geographic area.

The exemplary methods and/or procedures can also include receiving, from the VAE server, a second message indicating acknowledgement of a registration or an unregistration action requested in the first message. In some embodiments, the exemplary methods and/or procedures can also include receiving, from the VAE server, an ITS message corresponding to one of the first types of ITS messages to which the V2X client registered to receive. In some embodiments, the ITS message can be associated with the first geographic area.

Exemplary embodiments also include methods and/or procedures performed by a V2X application enabler (VAE) server in communication with a VAE client. The VAE client can be part of a V2X user equipment (UE), such as a wireless device. The exemplary methods and/or procedures can include receiving, from the VAE client, a first message comprising an identifier of the V2X UE and at least one of the following: identifiers of one or more first types of intelligent transportation system (ITS) messages, from the VAE server, to which the V2X UE wishes to register or unregister for receiving; and an identifier of a first geographic area that V2X UE wishes to register or unregister for association with the V2X UE at the VAE server. In some exemplary embodiments, the first message comprises the identifier of the first geographic area and identifiers of the first types of ITS messages that the V2X UE wishes to register for receiving with respect to the first geographic area.

The exemplary methods and/or procedures can also include performing a registration or an unregistration action identified in the first message. The exemplary method and/or procedure can also include sending, to the VAE client, a second message indicating acknowledgement of a registration or an unregistration action requested in the first message.

In some embodiments, the exemplary methods and/or procedures can also include receiving an intelligent transportation system (ITS) message from an V2X application-specific server, wherein the ITS message is associated with the following: a geographic region comprising the first geographic area, and one of the first types of ITS messages. Based on the V2X UE registration, the V2X UE can be identified as a target for the ITS message. In such embodiments, the exemplary methods and/or procedures can also include sending the ITS message to the VAE client.

Exemplary embodiments also include wireless devices (e.g., V2X UEs) or VAE servers (e.g., base stations) configured to perform the operations of the above-described methods and/or procedures, as well as non-transitory, computer-readable media storing computer-executable instructions that, when executed by a processor comprising a wireless device or VAE server, embody operations of the above-described methods and/or procedures.

BRIEF DESCRIPTION OF THE DRAWINGS

The following Figures illustrate various exemplary aspects of embodiments disclosed herein:

FIG. 15-18 are flow diagrams illustrating various exemplary methods and/or procedures implemented in a communication system, according to various exemplary embodiments of the present disclosure.

DETAILED DESCRIPTION

Figure 1:
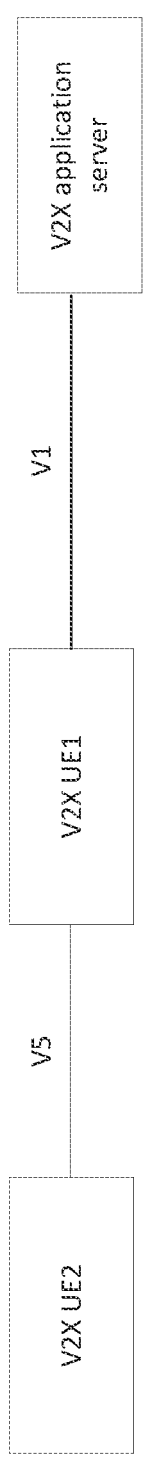
FIG. 1 shows a simplified architectural model for the V2X application layer as specified in 3GPP TS 23.285.
Figure 2:
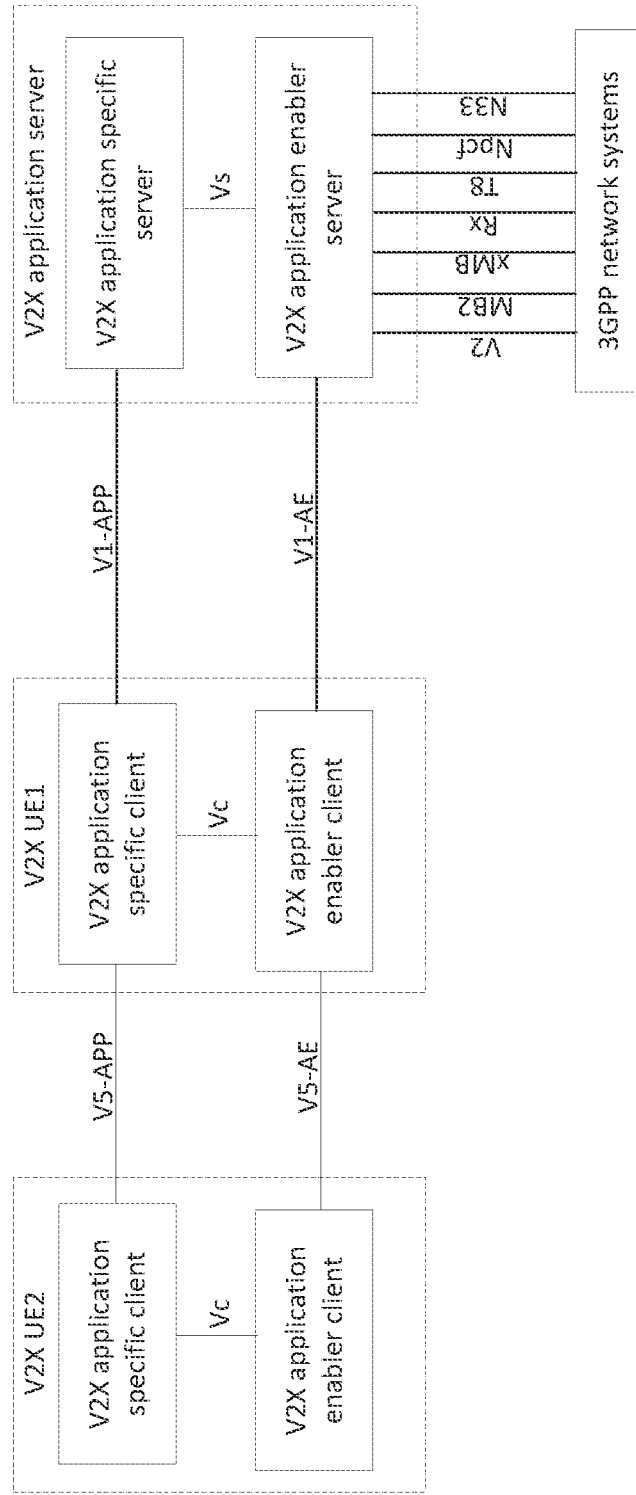
FIG. 2 shows a more detailed V2X application layer functional model.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

In the following descriptions, the terms "UE" and "wireless device" are used interchangeably. Unless otherwise noted, a UE can be any type of wireless device capable of communicating with network node or another UE over radio signals. The UE can also be a radio communication device, target device, device to device (D2D) UE, machine-type UE, UE capable of machine-to-machine communication (M2M) or machine type communication (MTC), UE category narrow band 1 (NB1), UE category NB2, UE category M1, UE category M2, low-cost and/or low-complexity UE, a sensor equipped with UE, tablet, mobile terminal, smart phone, laptop embedded equipped (LEE), laptop mounted equipment (LME), USB dongles, Customer Premises Equipment (CPE), etc.

In the following descriptions, the terms "network node" and "radio network node" are used interchangeably. Unless otherwise noted, a network node can be any type of base station, radio base station, base transceiver station, base station controller, network controller, RNC, evolved Node B (eNB), Node B, Multi-cell/multicast Coordination Entity (MCE), relay node, access point, radio access point, Remote Radio Unit (RRU) Remote Radio Head (RRH).

In the following descriptions, the term "physical channel" is used to describe a set of resource elements (REs) carrying information originating from higher layers, e.g., transport channel, RRC message, etc. Examples of downlink physical channels are Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), Physical Hybrid ARQ Indicator Channel (PHICH), Enhanced Physical Downlink Control Channel (EPDCCH), MPDCCH, NPDCCH, NPDSCH, NPBCH etc. System information such as system information broadcast (SIB1bis) may also be transmitted over physical channel such as PDSCH, NPSDCH etc.

As briefly mentioned above, information flows for V2X UEs to register for certain ITS messages and to report geographical area information to the V2X AS are currently undefined. Furthermore, procedures for using the information flow messages to deliver ITS messages to registered V2X UEs in targeted geographical locations are also undefined.

Exemplary embodiments of the present disclosure address these and other problems by establishing information flow and procedures for ITS message dissemination from V2X AS to V2X UEs in targeted geographical areas. Exemplary procedures can be triggered by a V2X UE that is interested in receiving certain ITS messages. The V2X UE can provide geographical location and/or area information to the VAE server. This information can be used by the VAE server to create a mapping between the geographical location and the identification of the V2X UE. The VAE server can also utilize this mapping for distributing ITS messages to targeted V2X UEs in a certain geographical area.

In some embodiments, the V2X UE can provide geographical location during the ITS message registration process. In some embodiments, the V2X UE can register for new ITS messages while updating the geographical area location. For instance, when moving to a new country, the location change might require registering for new ITS messages. In some embodiments, ITS messages can be delivered from V2X AS to V2X UEs over 3GPP Uu network interface. One advantage of these exemplary embodiments is a reduction in the number of transactions between the V2X UE and V2X AS.

Figure 3:
FIG. 3 shows an information flow diagram corresponding to an exemplary procedure for V2X UE registration, according to various exemplary embodiments of the present disclosure.

The following text describes various exemplary embodiments of a procedure for V2X UE registration for receiving ITS messages. Such text can be included, e.g., in a 3GPP technical specification (TS) and/or technical report (TR). FIG. 3 shows an information flow diagram corresponding to the procedure for V2X UE registration.

X.1.1 General
This subclause describes the procedures for V2X UE to register for receiving ITS messages from the V2X AS. The process is triggered by the V2X UE who is interested in receiving certain ITS messages.
X.1.2 Information Flows
X.1.2.1 V2X UE Registration Request
Table X.1.2.1-1 describes the information flow for V2X UE to register for specific ITS messages at the VAE server.

TABLE X.1.2.1-1

| V2X UE registration request | | |
|---|---|---|
| Information element | Status | Description |
| V2X UE ID | M | Identifier of the V2X UE |
| ITS MSG Service ID | M | ITS message types the V2X UE is interested in receiving (e.g., DENM, CAM) |

X.1.2.2 V2X AS Registration Response
Table X. 1.2.2-1 describes the information flow for VAE server to respond for registration request from the V2X UE.

TABLE X.1.2.2-1

| V2X AS registration/de-registration response | | |
|---|---|---|
| Information element | Status | Description |
| Ack | M | Acknowledgment from the VAE server in response to registration request |

X.1.3 Procedure
Pre-conditions: The V2X UE has discovered the V2X AS and is aware of the address of the V2X AS (e.g., FDQN).
1. As shown in FIG. 3, the client sends a registration request to the VAE server.
2. As shown in FIG. 3, the VAE server sends an acknowledgement to the VAE client.

Figure 4:
FIG. 4 shows an information flow diagram corresponding to an exemplary procedure for V2X UE unregistration, according to various exemplary embodiments of the present disclosure.

The following text describes various exemplary embodiments of a procedure for V2X UE unregistration from receiving one or more ITS messages (e.g., messages that the UE no longer desires to receive). Such text can be included, e.g., in a 3GPP technical specification (TS) and/or technical report (TR). FIG. 4 shows an information flow diagram corresponding to the procedure for V2X UE unregistration.
X.2.1 General
This subclause describes the procedures for V2X UE to unregister from receiving ITS messages from the V2X AS. The process is triggered by the V2X UE who is no longer interested in receiving certain ITS messages.
X.2.2 Information Flows
X.2.2.1 V2X UE Unregistration Request
Table X.2.2.1-1 describes the information flow for V2X UE to unregister from receiving specific ITS messages from the VAE server.

TABLE X.2.2.1-1

| V2X UE unregistration request | | |
|---|---|---|
| Information element | Status | Description |
| V2X UE ID | M | Identifier of the V2X UE |
| ITS MSG Service ID | M | ITS message types the V2X UE is no longer interested in receiving (e.g., DENM, CAM) |

X.2.2.2 V2X AS Unregistration Response

Table X.2.2.2-1 describes the information flow for VAE server to respond for unregistration request from the V2X UE.

TABLE X.2.2.2-1

V2X AS unregistration response

| Information element | Status | Description |
| --- | --- | --- |
| Ack | M | Acknowledgment from the VAE server in response to unregistration request |

X.2.3 Procedure

Pre-conditions: The V2X UE has already registered with the V2X AS as described in subclause X.1.3.

1. As shown in FIG. 4, the client sends an unregistration request to the VAE server.
2. As shown in FIG. 4, the VAE server sends an acknowledgement to the VAE client.

Figure 5:
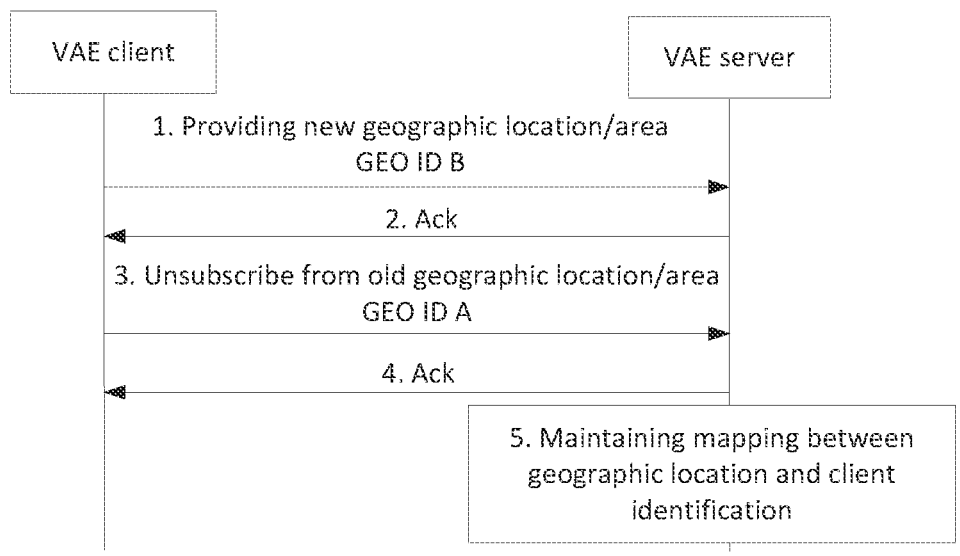
FIG. 5 shows an information flow diagram corresponding to an exemplary procedure for tracking geographical location, according to various exemplary embodiments of the present disclosure.

The following text describes various exemplary embodiments of a procedure for tracking geographical location of a V2X UE at a VAE server. Such text can be included, e.g., in a 3GPP technical specification (TS) and/or technical report (TR). FIG. 5 shows an information flow diagram corresponding to the procedure for tracking geographical location.

X.3.1 General

This subclause describes the procedures for tracking V2X UEs geographical location at the VAE server. The V2X UE provides geographical location/area information to the VAE server upon moving to a new geographical area. This information is used by the VAE server to create and update the mapping between the geographical location and the identification of the V2X UE.

X.3.2 Information Flows

X.3.2.1 V2X UE Geographical Area Subscription Request

Table X.3.2.1-1 describes the information flow for V2X UE to subscribe to a geographical area at the VAE server.

TABLE X.3.2.1-1

V2X UE geographical area subscription request

| Information element | Status | Description |
| --- | --- | --- |
| V2X UE ID | M | Identifier of the V2X UE |
| GEO ID | M | Geographical area identifier (e.g., subscription URI, tile identifier, geo-fence tile identifier) |

X.3.2.2 V2X AS Geographical Area Subscription Response

Table X.3.2.2-1 describes the information flow for VAE server to respond for geographical area subscription request from the V2X UE.

TABLE X.3.2.2-1

V2X AS geographical area subscription response

| Information element | Status | Description |
| --- | --- | --- |
| Ack | M | Acknowledgment from the VAE server in response to subscription request |

X.3.2.3 V2X UE Geographical Area Unsubscription Request

Table X.3.2.3-1 describes the information flow for V2X UE to unsubscribe from a geographical area at the VAE server.

TABLE X.3.2.3-1

V2X UE geographical area unsubscription request

| Information element | Status | Description |
| --- | --- | --- |
| V2X UE ID | M | Identifier of the V2X UE |
| GEO ID | M | Geographical area identifier (e.g., subscription URI, tile identifier, geo-fence tile identifier) |

X.3.2.2 V2X AS Geographical Area Subscription Response

Table X.3.2.4-1 describes the information flow for VAE server to respond for geographical area unsubscription request from the V2X UE.

TABLE X.3.2.4-1

V2X AS geographical area unsubscription response

| Information element | Status | Description |
| --- | --- | --- |
| Ack | M | Acknowledgment from the VAE server in response to unsubscription request |

X.3.3 Procedure

Pre-Conditions:
  The VAE client has registered with the VAE server as described in subclause X.1.3.
  The VAE client has subscribed to a certain geographical area identifier group (GEO ID A) in order to receive ITS messages for this area.

The procedure shown in FIG. 5 includes:
1. Upon entering a new geographical area, the client subscribes to the geographic area Geo ID B.
2. The VAE server acknowledges the client subscribe request.
3. The client unsubscribes from the old geographical area GEO ID A.
4. The VAE server acknowledges the client un-subscribe request.
5. The VAE server considers the new geographical area information GEO ID B with the client identification information V2X UD ID to create a mapping.

Figure 6:
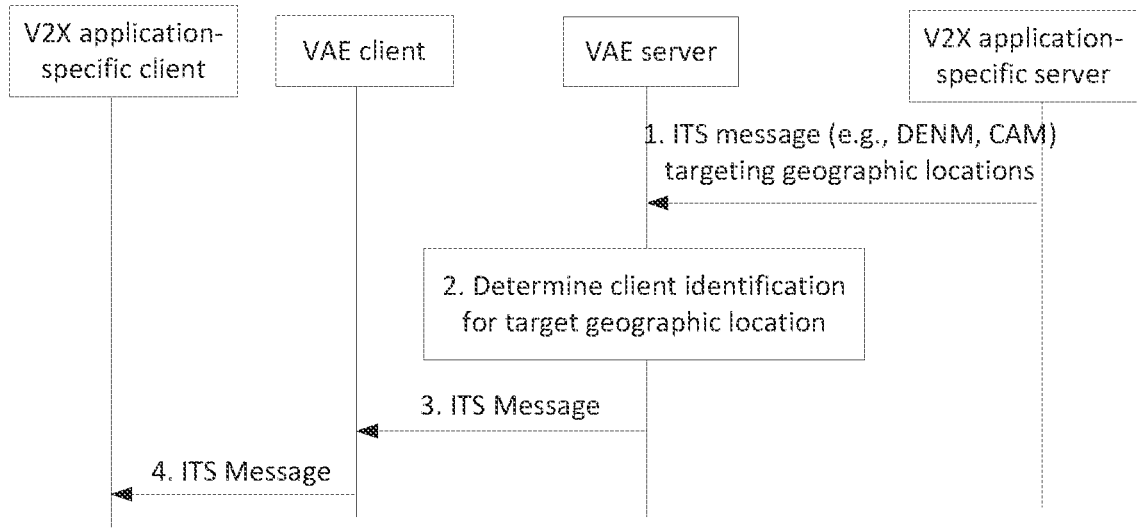
FIG. 6 shows an information flow diagram corresponding to an exemplary procedure for message delivery to target geographical areas from a VAE server, according to various exemplary embodiments of the present disclosure.

The following text describes various exemplary embodiments of a procedure for message delivery to target geographical areas from a VAE server. Such text can be included, e.g., in a 3GPP technical specification (TS) and/or technical report (TR). FIG. 6 shows an information flow diagram corresponding to the procedure for message delivery to target geographical areas from a VAE server.

X.4.1 General

This subclause describes the procedures for delivering ITS messages to registered V2X UEs at the VAE server in targeted geographical areas.

X.4.2 Procedure

Pre-condition: The VAE server has created a mapping between geographical location/area information and client identification as described in subclause X.3.3. The procedure shown in FIG. 6 includes:

1. The application-specific server sends an ITS message ITS MSG ID (e.g., DENM, CAM) with target geographical locations GEO ID.
2. The VAE server determines the client identification for the authorized clients in the target geographic locations using the mapping as specified in subclause X.3.3.
3. The VAE server transmits the message to each VAE client using the client identification.

4. The VAE client provides the ITS message to the application-specific client.

The following text describes various exemplary embodiments of a procedure for a V2X UE to provide geographical location information to a VAE server when registering for ITS messages. Such text can be included, e.g., in a 3GPP technical specification (TS) and/or technical report (TR). Although not shown, information flow diagrams for these exemplary embodiments can be similar to the exemplary flow diagrams shown in FIGS. 3 and 4.

X.1.2 Information Flows
X.1.2.1 V2X UE Registration/De-Registration Request

Table X.1.2.1-1 shows the information flow for a V2X UE to register/de-register for specific ITS messages at the VAE server.

TABLE X.1.2.1-1

| V2X UE registration/de-registration request | | |
|---|---|---|
| Information element | Status | Description |
| V2X UE ID | M | Identifier of the V2X UE registering for receiving ITS messages |
| GEO ID | M | Geographical area identifier (e.g., subscription URI, tile identifier, geo-fence tile identifier) |
| ITS MSG Service ID | M | ITS message types the V2X UE is interested in receiving (e.g., DENM, CAM) |
| ITS MSG Service Flag | M | Flag to register/de-register for ITS message: 1: Register 2: De-register |

Table X.1.2.1.2-1 describes the information flow for VAE server to respond for registration request from the V2X UE.

TABLE X.1.2.1-2

| V2X AS registration/de-registration response | | |
|---|---|---|
| Information element | Status | Description |
| Ack | M | Acknowledgment from the VAE server in response to registration/de-registration request |

Figure 7:
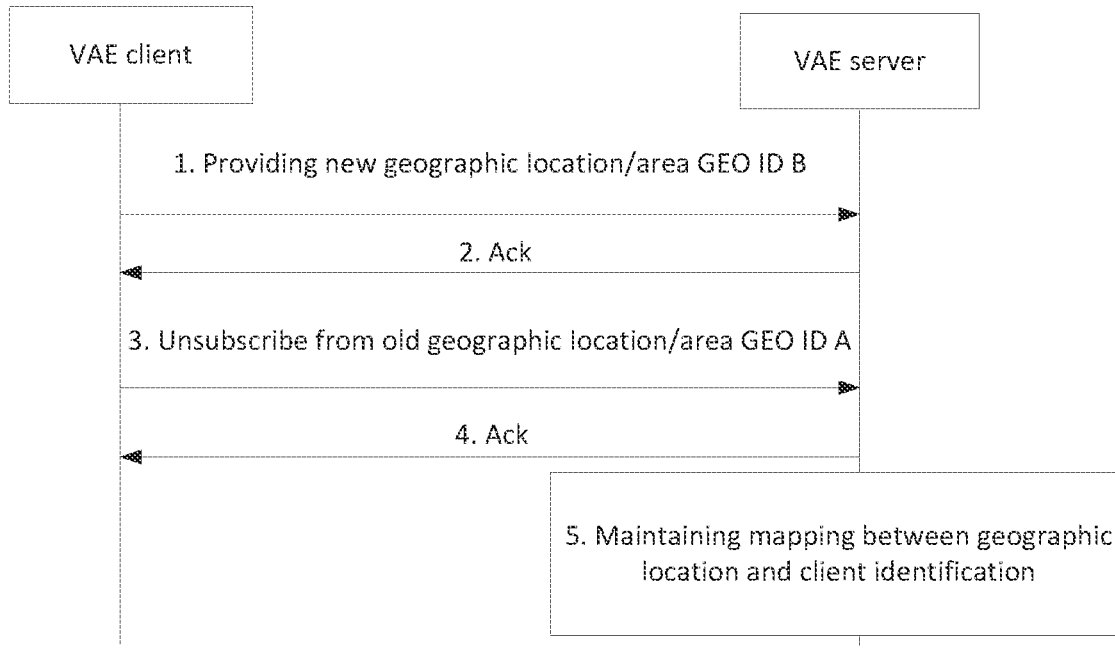
FIG. 7 shows an information flow diagram corresponding to an exemplary procedure for updating ITS message groups or topics when moving to a new area, according to various exemplary embodiments of the present disclosure.
Figure 8:
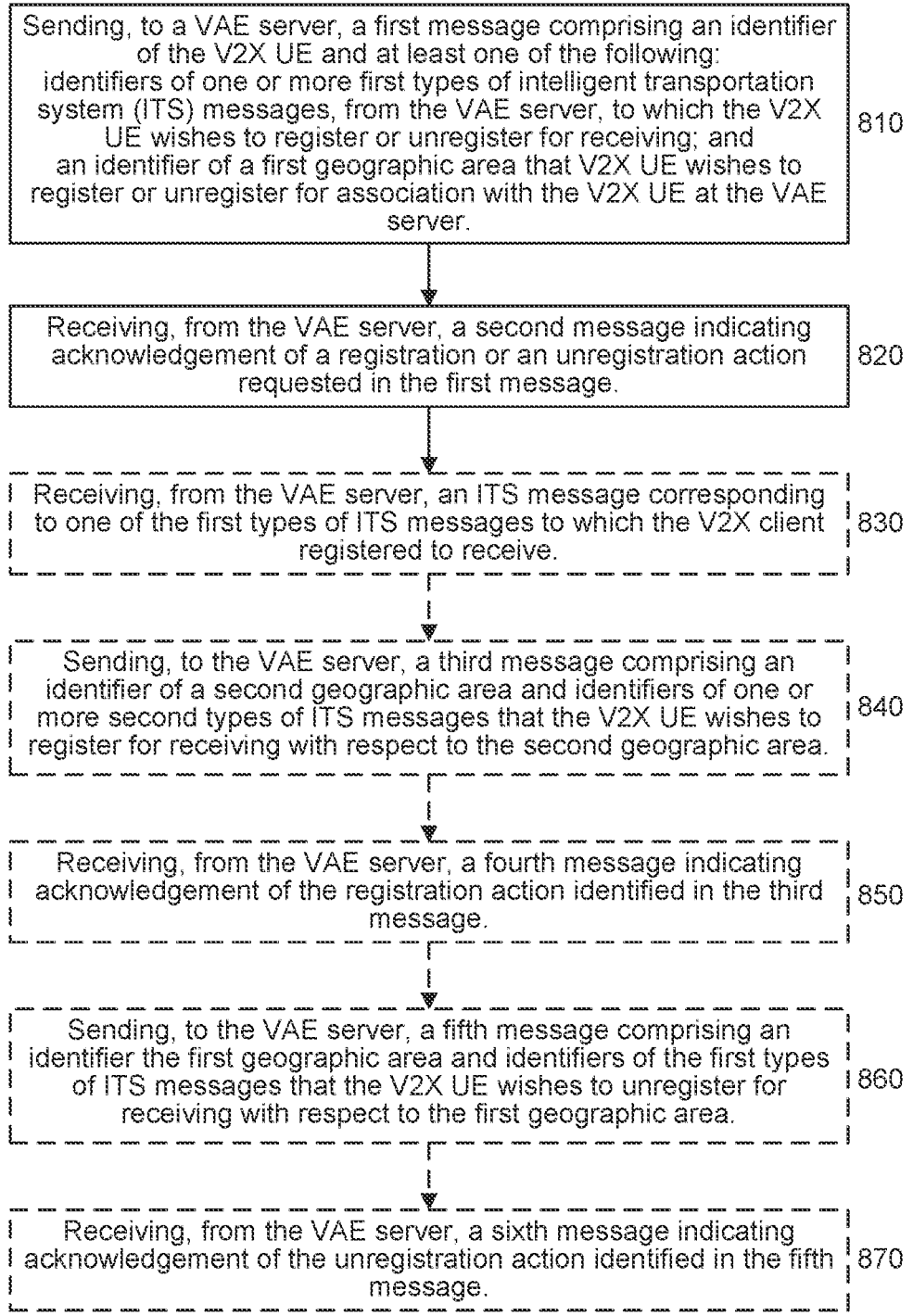
FIG. 8 is a flow diagram illustrating exemplary methods and/or procedures performed by a a V2X application enabler (VAE) client in communication with a VAE server, according to various exemplary embodiments of the present disclosure.
Figure 9:
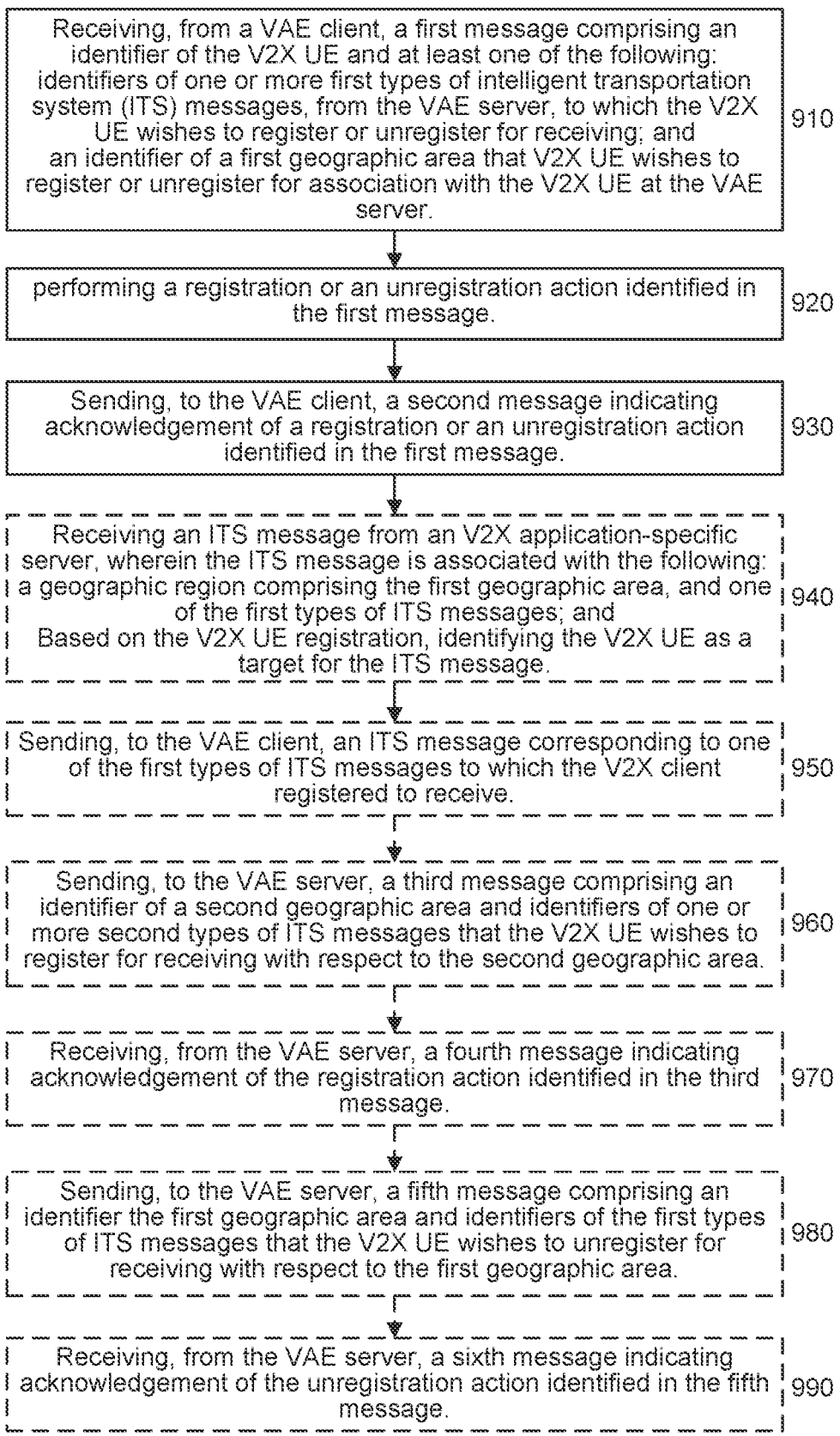
FIG. 9 is a flow diagram illustrating exemplary methods and/or procedures performed by a V2X application enabler (VAE) server in communication with a VAE client, according to various exemplary embodiments of the present disclosure.

The following text describes various exemplary embodiments of a procedure for a V2X UE to update ITS message groups or topics when moving to a new area. Such text can be included, e.g., in a 3GPP technical specification (TS) and/or technical report (TR). FIG. 7 shows an information flow diagram corresponding to the procedure for updating ITS message groups or topics when moving to a new area.
Pre-Conditions:
The VAE client has registered with the VAE server as described in subclause X.1.3.
The VAE client has subscribed to a certain geographical area identifier group (GEO ID A) in order to receive ITS messages for this area.
The procedure shown in FIG. 7 includes:
1. Upon entering a new geographical area, the client subscribes to receiving ITS messages from the geographic location/area information Geo ID B. The VAE client can utilize the V2X UE registration request to update the ITS message list by indicating the new ITS messages the UE is interested in receiving when moving to the new area.
2. The VAE server acknowledges the client subscribe request.
3. The client unsubscribes from the old geographical area GEO ID A to stop receiving ITS messages targeted for that area. The VAE client can utilize the V2X UE unregistration request to update the ITS message list by indicating ITS messages the UE is no longer interested in receiving when moving to the new area.
4. The VAE server acknowledges the client un-subscribe request.
5. The VAE server considers the new geographical area information GEO ID B with the client identification information V2X UD ID to create a mapping FIG. 8 illustrates an exemplary method and/or procedure performed by a V2X application enabler (VAE) client in communication with a VAE server, in accordance with particular exemplary embodiments of the present disclosure. The VAE client can be part of a V2X user equipment (UE), such as a wireless device. Although the exemplary method and/or procedure is illustrated in FIG. 8 by blocks in a particular order, this order is exemplary and the operations corresponding to the blocks can be performed in different orders, and can be combined and/or divided into blocks having different functionality than shown in FIG. 8. Furthermore, the exemplary method and/or procedure shown in FIG. 8 can be complementary to the exemplary method and/or procedure illustrated in FIG. 9. In other words, exemplary methods and/or procedures shown in FIGS. 8-9 are capable of being used cooperatively to provide benefits, advantages, and/or solutions to problems described hereinabove. Optional blocks and/or operations are indicated by dashed lines.

The exemplary method and/or procedure can include the operations of block 810, where the VAE client can send, to the VAE server, a first message comprising an identifier of the V2X UE and at least one of the following: identifiers of one or more first types of intelligent transportation system (ITS) messages, from the VAE server, to which the V2X UE wishes to register or unregister for receiving; and an identifier of a first geographic area that V2X UE wishes to register or unregister for association with the V2X UE at the VAE server. In some exemplary embodiments, the first message comprises the identifier of the first geographic area and identifiers of the first types of ITS messages that the V2X UE wishes to register for receiving with respect to the first geographic area.

The exemplary method and/or procedure can also include the operations of block 820, where the VAE client can receive, from the VAE server, a second message indicating acknowledgement of a registration or an unregistration action requested in the first message. In some embodiments, the exemplary method and/or procedure can also include the operations of block 830, where the VAE client can receive, from the VAE server, an ITS message corresponding to one of the first types of ITS messages to which the V2X client registered to receive. In some embodiments, the ITS message can be associated with the first geographic area.

In some embodiments, the exemplary method and/or procedure can also include the operations of block 840, where the VAE client can send, to the VAE server, a third message comprising an identifier of a second geographic area and identifiers of one or more second types of ITS messages that the V2X UE wishes to register for receiving with respect to the second geographic area. In such embodiments, the exemplary method and/or procedure can also include the operations of block 850, where the VAE client can receive, from the VAE server, a fourth message indicating acknowledgement of the registration action identified in the third message. In some embodiments, at least one of the first types of messages is not included in the second types of messages.

In some embodiments, the exemplary method and/or procedure can also include the operations of block 860, where the VAE client can send, to the VAE server, a fifth message comprising an identifier of the first geographic area and identifiers of the first types of ITS messages that the V2X UE wishes to unregister for receiving with respect to the first geographic area. In such embodiments, the exemplary method and/or procedure can also include the operations of block 870, where the VAE client can receive, from the VAE server, a sixth message indicating acknowledgement of the unregistration action identified in the fifth message.

FIG. 9 illustrates an exemplary method and/or procedure performed by a V2X application enabler (VAE) server in communication with a VAE client, in accordance with particular exemplary embodiments of the present disclosure. The VAE client can be part of a V2X user equipment (UE), such as a wireless device. Although the exemplary method and/or procedure is illustrated in FIG. 9 by blocks in a particular order, this order is exemplary and the operations corresponding to the blocks can be performed in different orders, and can be combined and/or divided into blocks having different functionality than shown in FIG. 9. Furthermore, the exemplary method and/or procedure shown in FIG. 9 can be complementary to exemplary methods and/or procedures illustrated in FIG. 8. In other words, exemplary methods and/or procedures shown in FIGS. 8-9 are capable of being used cooperatively to provide benefits, advantages, and/or solutions to problems described hereinabove. Optional blocks and/or operations are indicated by dashed lines.

The exemplary method and/or procedure can include the operations of block 910, where the VAE server can receive, from the VAE client, a first message comprising an identifier of the V2X UE and at least one of the following: identifiers of one or more first types of intelligent transportation system (ITS) messages, from the VAE server, to which the V2X UE wishes to register or unregister for receiving; and an identifier of a first geographic area that V2X UE wishes to register or unregister for association with the V2X UE at the VAE server. In some exemplary embodiments, the first message comprises the identifier of the first geographic area and identifiers of the first types of ITS messages that the V2X UE wishes to register for receiving with respect to the first geographic area.

The exemplary method and/or procedure can also include the operations of block 920, where the VAE server can perform a registration or an unregistration action identified in the first message. The exemplary method and/or procedure can also include the operations of block 930, where the VAE server can send, to the VAE client, a second message indicating acknowledgement of a registration or an unregistration action requested in the first message.

In some embodiments, the exemplary method and/or procedure can also include the operations of block 940, where the VAE server can receive an intelligent transportation system (ITS) message from an V2X application-specific server, wherein the ITS message is associated with the following: a geographic region comprising the first geographic area, and one of the first types of ITS messages. Based on the V2X UE registration, the VAE server can identify the V2X UE as a target for the ITS message. In such embodiments, the exemplary method and/or procedure can also include the operations of block 950, where the VAE server can send the ITS message to the VAE client.

In some embodiments, the exemplary method and/or procedure can also include the operations of block 960, where the VAE server can receive, from the VAE client, a third message comprising an identifier of a second geographic area and identifiers of one or more second types of ITS messages that the V2X UE wishes to register for receiving with respect to the second geographic area. In such embodiments, the exemplary method and/or procedure can also include the operations of block 970, where the VAE server can send, to the VAE client, a fourth message indicating acknowledgement of the registration action identified in the third message. In some embodiments, at least one of the first types of messages is not included in the second types of messages.

In some embodiments, the exemplary method and/or procedure can also include the operations of block 980, where the VAE server can receive, from the VAE client, a fifth message comprising an identifier of the first geographic area and identifiers of the first types of ITS messages that the V2X UE wishes to unregister for receiving with respect to the first geographic area. In such embodiments, the exemplary method and/or procedure can also include the operations of block 990, where the VAE server send, to the VAE client, a sixth message indicating acknowledgement of the unregistration action identified in the fifth message.

Figure 10:
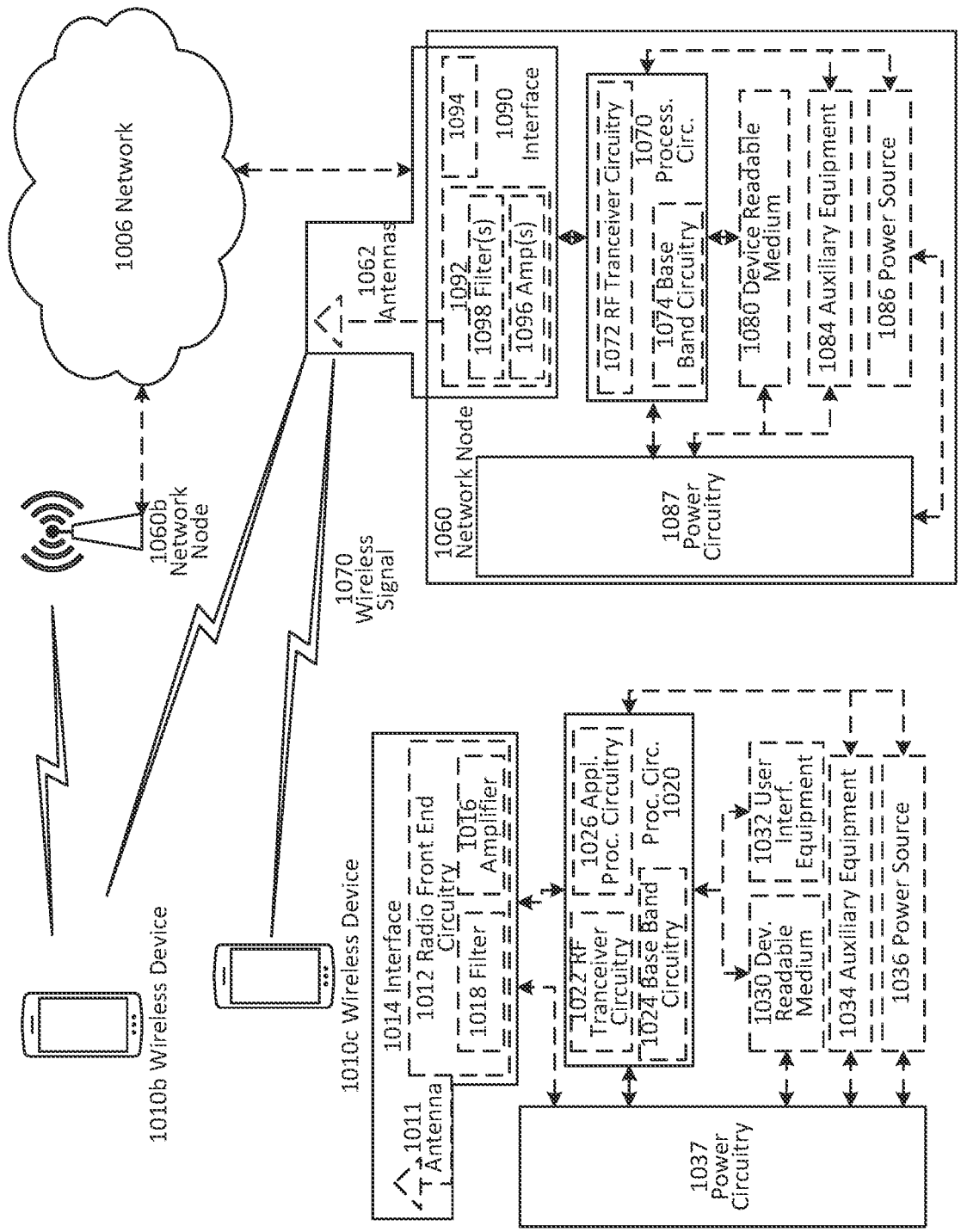
FIG. 10 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060*b*, and WDs 1010, 1010*b*, and 1010*c*. In practice, a wireless network can further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some exemplary embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1060 are depicted as single boxes located within a larger box, or nested within multiple boxes, in practice, a network node can comprise multiple different physical components that make up a single illustrated component (e.g., device readable medium 1080 can comprise multiple separate hard drives as well as multiple RAM modules).

Similarly, network node 1060 can be composed of multiple physically separate components (e.g., a NodeB component and a RNC component, or a BTS component and a BSC component, etc.), which can each have their own respective components. In certain scenarios in which network node 1060 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some exemplary embodiments, network node 1060 can be configured to support multiple radio access technologies (RATs). In such embodiments, some components can be duplicated (e.g., separate device readable medium 1080 for the different RATs) and some components can be reused (e.g., the same antenna 1062 can be shared by the RATs). Network node 1060 can also include multiple sets of the various illustrated components for different wireless technologies integrated into network node 1060, such as, for example, GSM, WCDMA, LTE, NR, WiFi, or Bluetooth wireless technologies. These wireless technologies can be integrated into the same or different chip or set of chips and other components within network node 1060.

Processing circuitry 1070 can be configured to perform any determining, calculating, or similar operations (e.g., certain obtaining operations) described herein as being provided by a network node. These operations performed by processing circuitry 1070 can include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 can execute instructions stored in device readable medium 1080 or in memory within processing circuitry 1070. Such functionality can include providing any of the various wireless features, functions, or benefits discussed herein. In some exemplary embodiments, processing circuitry 1070 can include a system on a chip (SOC).

In some exemplary embodiments, processing circuitry 1070 can include one or more of radio frequency (RF) transceiver circuitry 1072 and baseband processing circuitry 1074. In some exemplary embodiments, radio frequency (RF) transceiver circuitry 1072 and baseband processing circuitry 1074 can be on separate chips (or sets of chips), boards, or units, such as radio units and digital units. In alternative embodiments, part or all of RF transceiver circuitry 1072 and baseband processing circuitry 1074 can be on the same chip or set of chips, boards, or units In certain embodiments, some or all of the functionality described herein as being provided by a network node, base station, eNB or other such network device can be performed by processing circuitry 1070 executing instructions stored on device readable medium 1080 or memory within processing circuitry 1070. In alternative embodiments, some or all of the functionality can be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1070. Device readable medium 1080 can store any suitable instructions, data or information, including a computer program, software, an application including one or more of logic, rules, code, tables, etc. and/or other instructions capable of being executed by processing circuitry 1070 and, utilized by network node 1060. Device readable medium 1080 can be used to store any calculations made by processing circuitry 1070 and/or any data received via interface 1090. In some exemplary embodiments, processing circuitry 1070 and device readable medium 1080 can be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that can be coupled to, or in certain embodiments a part of, antenna 1062. Radio front end circuitry 1092 comprises filters 1098 and amplifiers 1096. Radio front end circuitry 1092 can be connected to antenna 1062 and processing circuitry 1070. Radio front end circuitry can be configured to condition signals communicated between antenna 1062 and processing circuitry 1070. Radio front end circuitry 1092 can receive digital data that is to be sent out to other network nodes or WDs via a wireless connection. Radio front end circuitry 1092 can convert the digital data into a radio signal having the appropriate channel and bandwidth parameters using a combination of filters 1098 and/or amplifiers 1096. The radio signal can then be transmitted via antenna 1062. Similarly, when receiving data, antenna 1062 can collect radio signals which are then converted into digital data by radio front end circuitry 1092. The digital data can be passed to processing circuitry 1070. In other embodiments, the interface can comprise different components and/or different combinations of components.

In certain alternative embodiments, network node 1060 may not include separate radio front end circuitry 1092, instead, processing circuitry 1070 can comprise radio front end circuitry and can be connected to antenna 1062 without separate radio front end circuitry 1092. Similarly, in some exemplary embodiments, all or some of RF transceiver circuitry 1072 can be considered a part of interface 1090. In still other embodiments, interface 1090 can include one or more ports or terminals 1094, radio front end circuitry 1092, and RF transceiver circuitry 1072, as part of a radio unit (not shown), and interface 1090 can communicate with baseband processing circuitry 1074, which is part of a digital unit (not shown).

Antenna 1062 can include one or more antennas, or antenna arrays, configured to send and/or receive wireless signals. Antenna 1062 can be coupled to radio front end circuitry 1090 and can be any type of antenna capable of transmitting and receiving data and/or signals wirelessly. In some exemplary embodiments, antenna 1062 can comprise one or more omni-directional, sector or panel antennas operable to transmit/receive radio signals between, for example, 2 GHZ and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1062 can be separate from network node 1060 and can be connectable to network node 1060 through an interface or port.

Antenna 1062, interface 1090, and/or processing circuitry 1070 can be configured to perform any receiving operations and/or certain obtaining operations described herein as being performed by a network node. Any information, data and/or signals can be received from a wireless device, another network node and/or any other network equipment. Similarly, antenna 1062, interface 1090, and/or processing circuitry 1070 can be configured to perform any transmitting operations described herein as being performed by a network node. Any information, data and/or signals can be transmitted to a wireless device, another network node and/or any other network equipment.

Power circuitry 1087 can comprise, or be coupled to, power management circuitry and can be configured to supply the components of network node 1060 with power for performing the functionality described herein. Power circuitry 1087 can receive power from power source 1086. Power source 1086 and/or power circuitry 1087 can be configured to provide power to the various components of network node 1060 in a form suitable for the respective components (e.g., at a voltage and current level needed for each respective component). Power source 1086 can either be included in, or external to, power circuitry 1087 and/or network node 1060. For example, network node 1060 can be connectable to an external power source (e.g., an electricity outlet) via an input circuitry or interface such as an electrical cable, whereby the external power source supplies power to power circuitry 1087. As a further example, power source 1086 can comprise a source of power in the form of a battery or battery pack which is connected to, or integrated in, power circuitry 1087. The battery can provide backup power should the external power source fail. Other types of power sources, such as photovoltaic devices, can also be used.

Alternative embodiments of network node 1060 can include additional components beyond those shown in FIG. 10 that can be responsible for providing certain aspects of the network node's functionality, including any of the functionality described herein and/or any functionality necessary to support the subject matter described herein. For example, network node 1060 can include user interface equipment to allow and/or facilitate input of information into network node 1060 and to allow and/or facilitate output of information from network node 1060. This can allow and/or facilitate a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some exemplary embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. . . .

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1010 includes antenna 1011, interface 1010, processing circuitry 1020, device readable medium 1030, user interface equipment 1032, auxiliary equipment 1034, power source 1036 and power circuitry 1037. WD 1010 can include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies can be integrated into the same or different chips or set of chips as other components within WD 1010.

Antenna 1011 can include one or more antennas or antenna arrays, configured to send and/or receive wireless signals, and is connected to interface 1010. In certain alternative embodiments, antenna 1011 can be separate from WD 1010 and be connectable to WD 1010 through an interface or port. Antenna 1011, interface 1010, and/or processing circuitry 1020 can be configured to perform any receiving or transmitting operations described herein as being performed by a WD. Any information, data and/or signals can be received from a network node and/or another WD. In some exemplary embodiments, radio front end circuitry and/or antenna 1011 can be considered an interface.

As illustrated, interface 1010 can comprise radio front end circuitry 1012 and antenna 1011. Radio front end circuitry 1012 can comprise one or more filters 1018 and amplifiers 1016. Radio front end circuitry 1012 can be connected to antenna 1011 and processing circuitry 1020, and can be configured to condition signals communicated between antenna 1011 and processing circuitry 1020. Radio front end circuitry 1012 can be coupled to or a part of antenna 1011. In some exemplary embodiments, WD 1010 may not include separate radio front end circuitry 1012; rather, processing circuitry 1020 can comprise radio front end circuitry and can be connected to antenna 1011. Similarly, in some exemplary embodiments, some or all of RF transceiver circuitry 1022 can be considered a part of interface 1010. Radio front end circuitry 1012 can receive digital data that is to be sent out to other network nodes or WDs via a wireless connection. Radio front end circuitry 1012 can convert the digital data into a radio signal having the appropriate channel and bandwidth parameters using a combination of filters 1018 and/or amplifiers 1016. The radio signal can then be transmitted via antenna 1011. Similarly, when receiving data, antenna 1011 can collect radio signals which are then converted into digital data by radio front end circuitry 1012. The digital data can be passed to processing circuitry 1020. In other embodiments, the interface can comprise different components and/or different combinations of components.

Processing circuitry 1020 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality can include providing any of the various wireless features or benefits discussed herein. For example, processing circuitry 1020 can execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry can comprise different components and/or different combinations of components. In certain embodiments processing circuitry 1020 of WD 1010 can comprise a SOC. In some exemplary embodiments, RF transceiver circuitry 1022, baseband processing circuitry 1024, and application processing circuitry 1026 can be on separate chips or sets of chips. In alternative embodiments, part or all of baseband processing circuitry 1024 and application processing circuitry 1026 can be combined into one chip or set of chips, and RF transceiver circuitry 1022 can be on a separate chip or set of chips. In still alternative embodiments, part or all of RF transceiver circuitry 1022 and baseband processing circuitry 1024 can be on the same chip or set of chips, and application processing circuitry 1026 can be on a separate chip or set of chips. In yet other alternative embodiments, part or all of RF transceiver circuitry 1022, baseband processing circuitry 1024, and application processing circuitry 1026 can be combined in the same chip or set of chips. In some exemplary embodiments, RF transceiver circuitry 1022 can be a part of interface 1010. RF transceiver circuitry 1022 can condition RF signals for processing circuitry 1020.

In certain embodiments, some or all of the functionality described herein as being performed by a WD can be provided by processing circuitry 1020 executing instructions stored on device readable medium 1030, which in certain embodiments can be a computer-readable storage medium. In alternative embodiments, some or all of the functionality can be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 can be configured to perform any determining, calculating, or similar operations (e.g., certain obtaining operations) described herein as being performed by a WD. These operations, as performed by processing circuitry 1020, can include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 can be operable to store a computer program, software, an application including one or more of logic, rules, code, tables, etc. and/or other instructions capable of being executed by processing circuitry 1020. Device readable medium 1030 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1020. In some exemplary embodiments, processing circuitry 1020 and device readable medium 1030 can be considered to be integrated.

User interface equipment 1032 can include components that allow and/or facilitate a human user to interact with WD 1010. Such interaction can be of many forms, such as visual, audial, tactile, etc. User interface equipment 1032 can be operable to produce output to the user and to allow and/or facilitate the user to provide input to WD 1010. The type of interaction can vary depending on the type of user interface equipment 1032 installed in WD 1010. For example, if WD 1010 is a smart phone, the interaction can be via a touch screen; if WD 1010 is a smart meter, the interaction can be through a screen that provides usage (e.g., the number of gallons used) or a speaker that provides an audible alert (e.g., if smoke is detected). User interface equipment 1032 can include input interfaces, devices and circuits, and output interfaces, devices and circuits. User interface equipment 1032 can be configured to allow and/or facilitate input of information into WD 1010, and is connected to processing circuitry 1020 to allow and/or facilitate processing circuitry 1020 to process the input information. User interface equipment 1032 can include, for example, a microphone, a proximity or other sensor, keys/buttons, a touch display, one or more cameras, a USB port, or other input circuitry. User interface equipment 1032 is also configured to allow and/or facilitate output of information from WD 1010, and to allow and/or facilitate processing circuitry 1020 to output information from WD 1010. User interface equipment 1032 can include, for example, a speaker, a display, vibrating circuitry, a USB port, a headphone interface, or other output circuitry. Using one or more input and output interfaces, devices, and circuits, of user interface equipment 1032, WD 1010 can communicate with end users and/or the wireless network, and allow and/or facilitate them to benefit from the functionality described herein.

Auxiliary equipment 1034 is operable to provide more specific functionality which may not be generally performed by WDs. This can comprise specialized sensors for doing measurements for various purposes, interfaces for additional types of communication such as wired communications etc. The inclusion and type of components of auxiliary equipment 1034 can vary depending on the embodiment and/or scenario.

Power source 1036 can, in some exemplary embodiments, be in the form of a battery or battery pack. Other types of power sources, such as an external power source (e.g., an electricity outlet), photovoltaic devices or power cells, can also be used. WD 1010 can further comprise power circuitry 1037 for delivering power from power source 1036 to the various parts of WD 1010 which need power from power source 1036 to carry out any functionality described or indicated herein. Power circuitry 1037 can in certain embodiments comprise power management circuitry. Power circuitry 1037 can additionally or alternatively be operable to receive power from an external power source; in which case WD 1010 can be connectable to the external power source (such as an electricity outlet) via input circuitry or an interface such as an electrical power cable. Power circuitry 1037 can also in certain embodiments be operable to deliver power from an external power source to power source 1036. This can be, for example, for the charging of power source 1036. Power circuitry 1037 can perform any converting or other modification to the power from power source 1036 to make it suitable for supply to the respective components of WD 1010.

Figure 11:
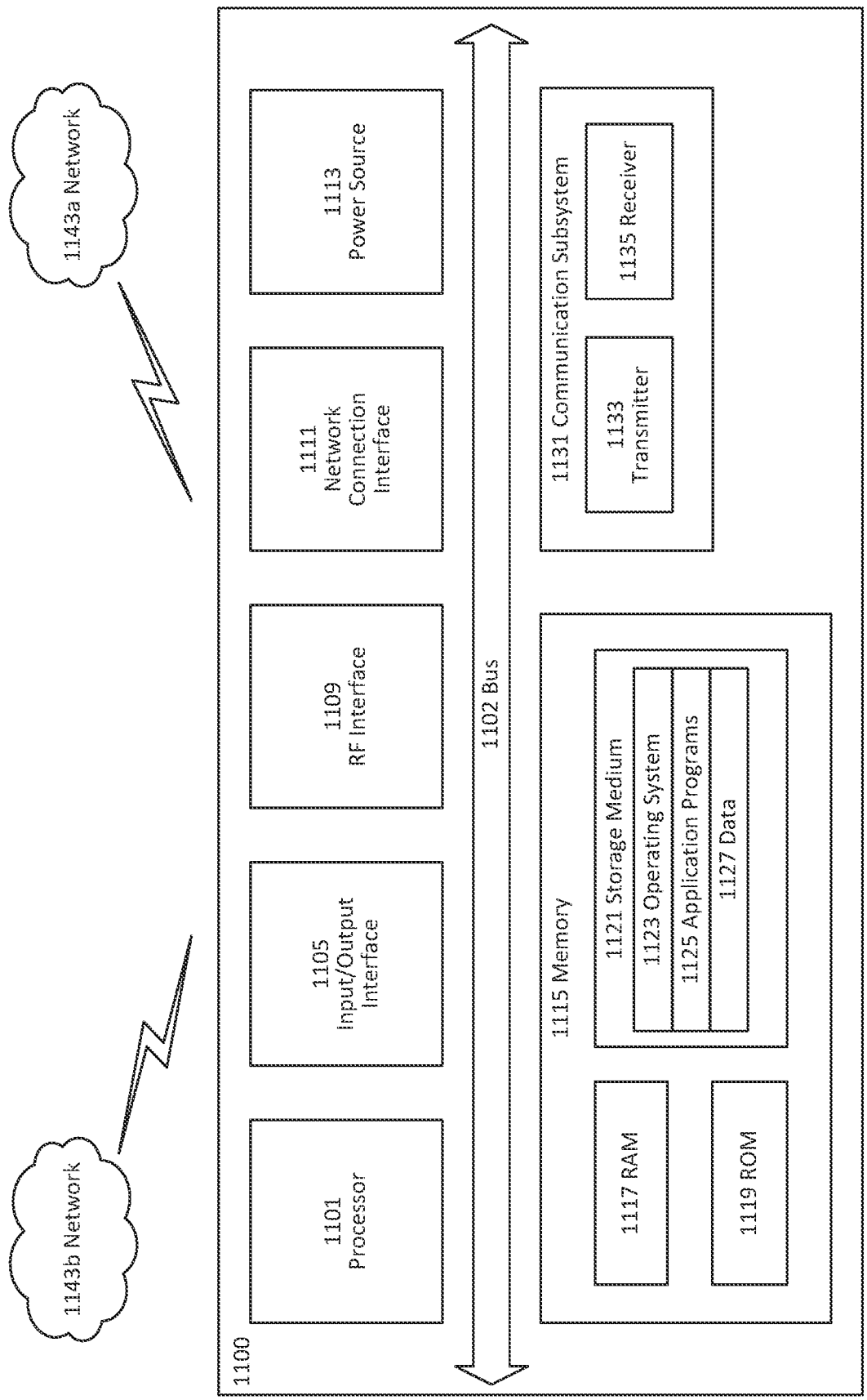
FIG. 11 is a block diagram of an exemplary user equipment (UE) configurable according to various exemplary embodiments of the present disclosure.

FIG. 11 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 11200 can be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 can include other similar types of information. Certain UEs can utilize all of the components shown in FIG. 11, or only a subset of the components. The level of integration between the components can vary from one UE to another UE. Further, certain UEs can contain multiple instances of a component, such as multiple processors, memories, transceivers, transmitters, receivers, etc.

In FIG. 11, processing circuitry 1101 can be configured to process computer instructions and data. Processing circuitry 1101 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 can include two central processing units (CPUs). Data can be information in a form suitable for use by a computer.

In the depicted embodiment, input/output interface 1105 can be configured to provide a communication interface to an input device, output device, or input and output device. UE 1100 can be configured to use an output device via input/output interface 1105. An output device can use the same type of interface port as an input device. For example, a USB port can be used to provide input to and output from UE 1100. The output device can be a speaker, a sound card, a video card, a display, a monitor, a printer, an actuator, an emitter, a smartcard, another output device, or any combination thereof. UE 1100 can be configured to use an input device via input/output interface 1105 to allow and/or facilitate a user to capture information into UE 1100. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 11, RF interface 1109 can be configured to provide a communication interface to RF components such as a transmitter, a receiver, and an antenna. Network connection interface 1111 can be configured to provide a communication interface to network 1143a. Network 1143a can encompass wired and/or wireless networks such as a local-area network (LAN), a wide-area network (WAN), a computer network, a wireless network, a telecommunications network, another like network or any combination thereof. For example, network 1143a can comprise a Wi-Fi network. Network connection interface 1111 can be configured to include a receiver and a transmitter interface used to communicate with one or more other devices over a communication network according to one or more communication protocols, such as Ethernet, TCP/IP, SONET, ATM, or the like. Network connection interface 1111 can implement receiver and transmitter functionality appropriate to the communication network links (e.g., optical, electrical, and the like). The transmitter and receiver functions can share circuit components, software or firmware, or alternatively can be implemented separately.

RAM 1117 can be configured to interface via bus 1102 to processing circuitry 1101 to provide storage or caching of data or computer instructions during the execution of software programs such as the operating system, application programs, and device drivers. ROM 1119 can be configured to provide computer instructions or data to processing circuitry 1101. For example, ROM 1119 can be configured to store invariant low-level system code or data for basic system functions such as basic input and output (I/O), startup, or reception of keystrokes from a keyboard that are stored in a non-volatile memory. Storage medium 1121 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 can be configured to include operating system 1123, application program 1125 such as a web browser application, a widget or gadget engine or another application, and data file 1127. Storage medium 1121 can store, for use by UE 1100, any of a variety of various operating systems or combinations of operating systems.

Storage medium 1121 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 can allow and/or facilitate UE 1100 to access computer-executable instructions, application programs or the like, stored on transitory or non-transitory memory media, to off-load data, or to upload data. An article of manufacture, such as one utilizing a communication system can be tangibly embodied in storage medium 1121, which can comprise a device readable medium.

In FIG. 11, processing circuitry 1101 can be configured to communicate with network 1143b using communication subsystem 1131. Network 1143a and network 1143b can be the same network or networks or different network or networks. Communication subsystem 1131 can be configured to include one or more transceivers used to communicate with network 1143*b*. For example, communication subsystem 1131 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1133 and/or receiver 1135 to implement transmitter or receiver functionality, respectively, appropriate to the RAN links (e.g., frequency allocations and the like). Further, transmitter 1133 and receiver 1135 of each transceiver can share circuit components, software or firmware, or alternatively can be implemented separately.

In the illustrated embodiment, the communication functions of communication subsystem 1131 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 can include cellular communication, Wi-Fi communication, Bluetooth communication, and GPS communication. Network 1143*b* can encompass wired and/or wireless networks such as a local-area network (LAN), a wide-area network (WAN), a computer network, a wireless network, a telecommunications network, another like network or any combination thereof. For example, network 1143*b* can be a cellular network, a Wi-Fi network, and/or a near-field network. Power source 11131 can be configured to provide alternating current (AC) or direct current (DC) power to components of UE 1100.

The features, benefits and/or functions described herein can be implemented in one of the components of UE 1100 or partitioned across multiple components of UE 1100. Further, the features, benefits, and/or functions described herein can be implemented in any combination of hardware, software or firmware. In one example, communication subsystem 1131 can be configured to include any of the components described herein. Further, processing circuitry 1101 can be configured to communicate with any of such components over bus 1102. In another example, any of such components can be represented by program instructions stored in memory that when executed by processing circuitry 1101 perform the corresponding functions described herein. In another example, the functionality of any of such components can be partitioned between processing circuitry 1101 and communication subsystem 1131. In another example, the non-computationally intensive functions of any of such components can be implemented in software or firmware and the computationally intensive functions can be implemented in hardware.

Figure 12:
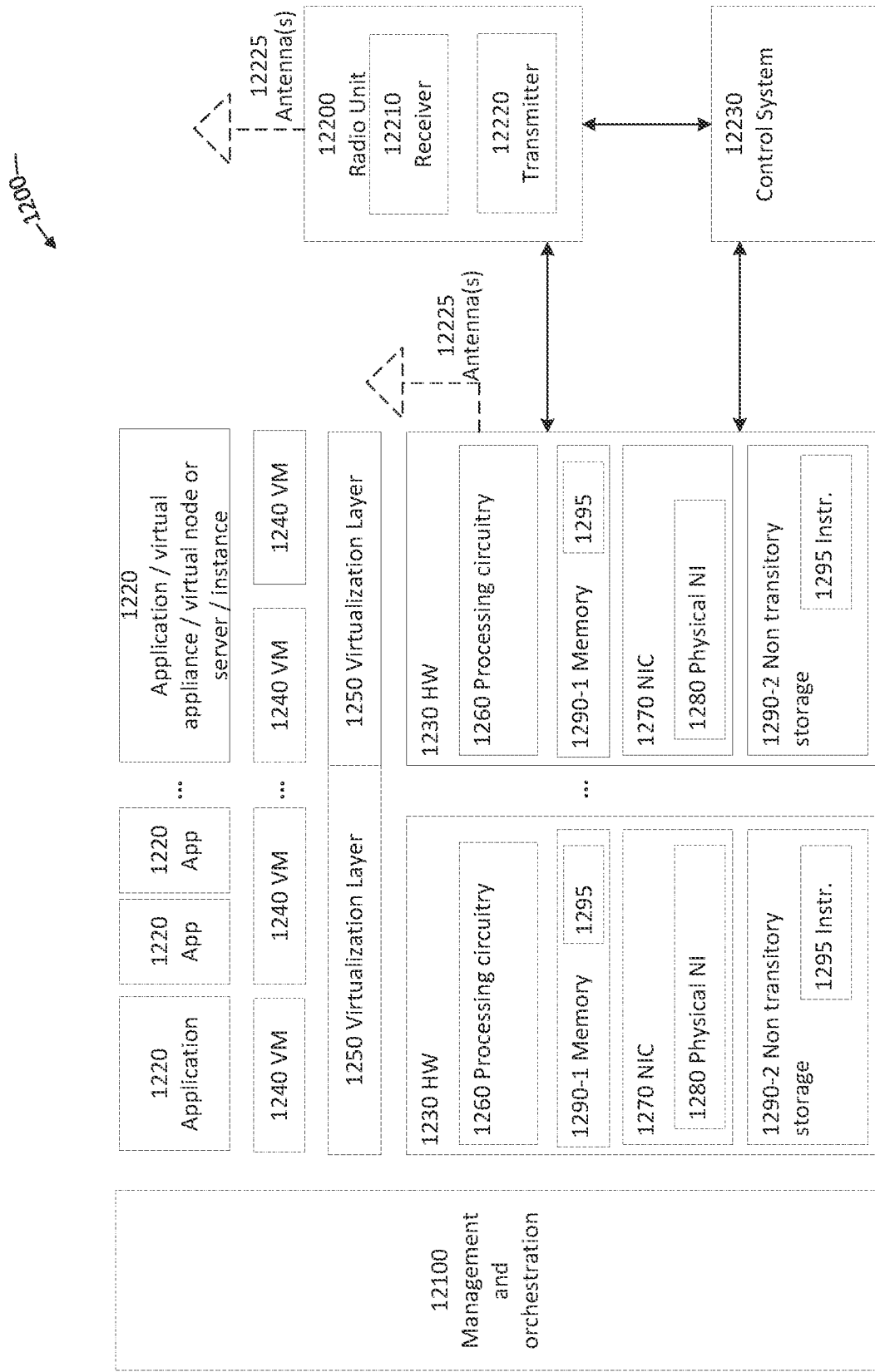
FIG. 12 is a block diagram of illustrating a virtualization environment that can facilitate virtualization of various functions implemented according to various exemplary embodiments of the present disclosure.
Figure 13:
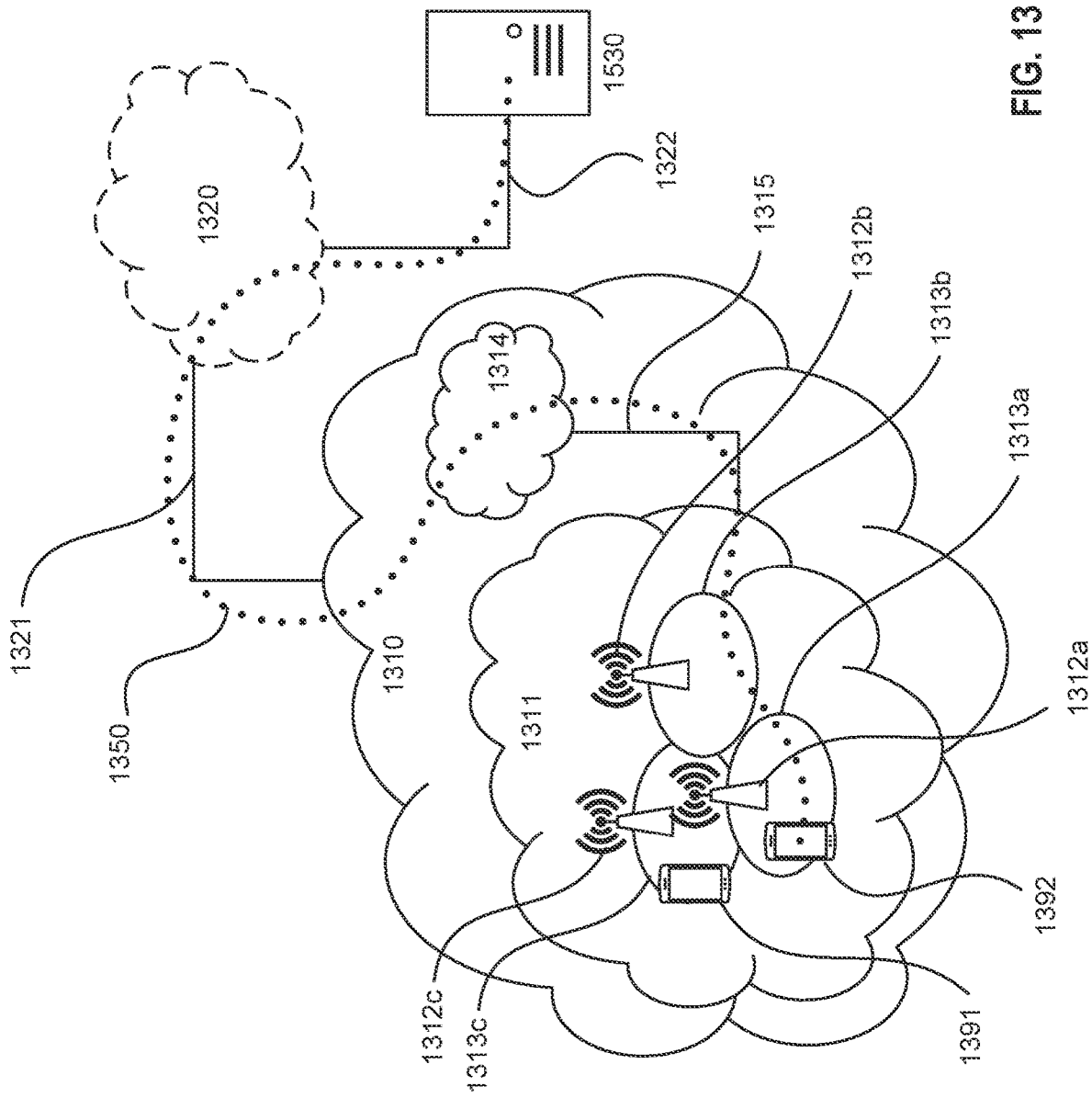
FIGS. 13-14 are block diagrams of exemplary communication systems configurable according to various exemplary embodiments of the present disclosure.
Figure 14:
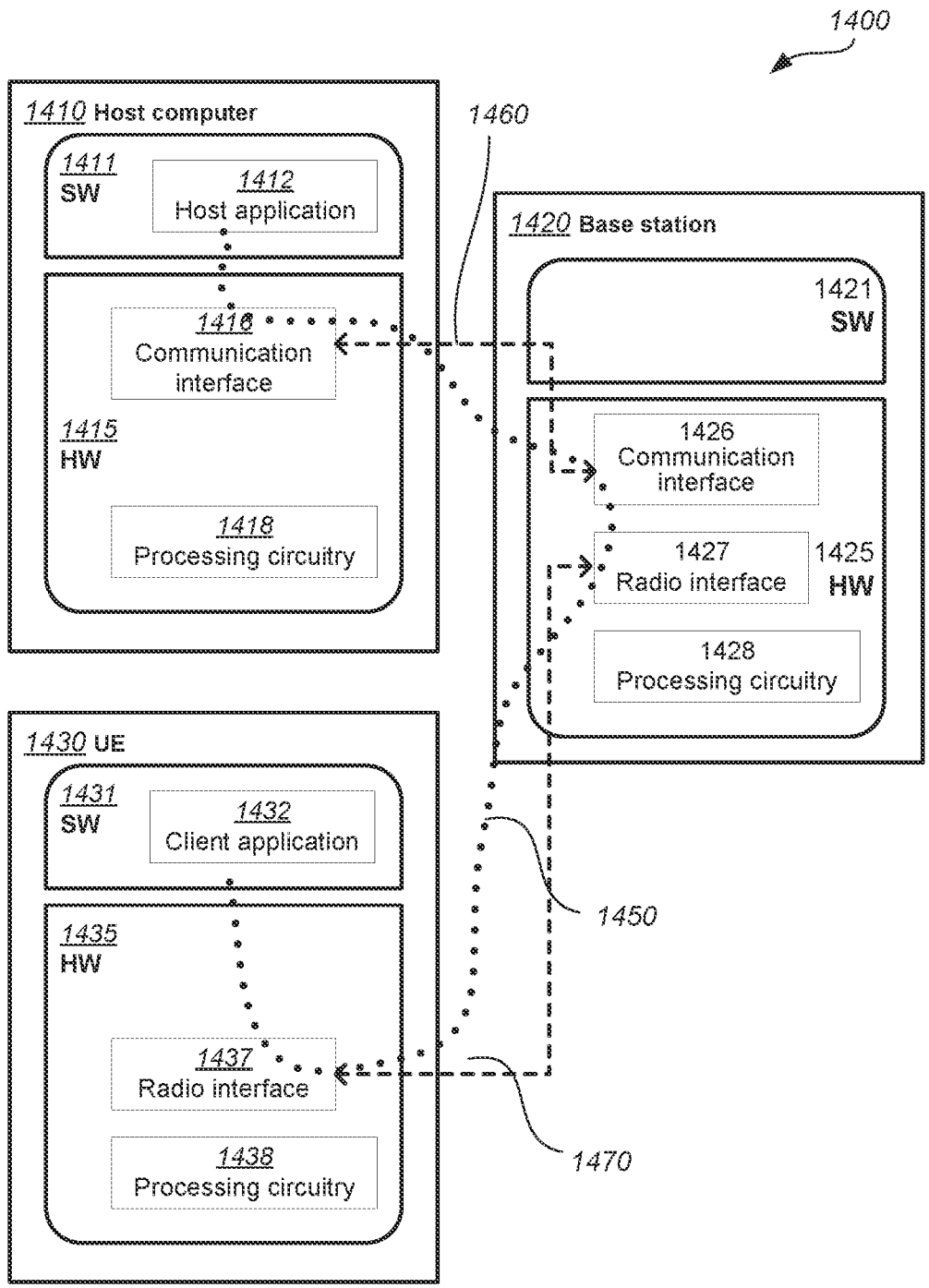

FIG. 12 is a schematic block diagram illustrating a virtualization environment 1200 in which functions implemented by some exemplary embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some exemplary embodiments, some or all of the functions described herein can be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node can be entirely virtualized.

The functions can be implemented by one or more applications 1220 (which can alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which can be commercial off-the-shelf (COTS) processors, dedicated Application Specific Integrated Circuits (ASICs), or any other type of processing circuitry including digital or analog hardware components or special purpose processors. Each hardware device can comprise memory 1290-1 which can be non-persistent memory for temporarily storing instructions 1295 or software executed by processing circuitry 1260. Each hardware device can comprise one or more network interface controllers (NICs) 1270, also known as network interface cards, which include physical network interface 1280. Each hardware device can also include non-transitory, persistent, machine-readable storage media 1290-2 having stored therein software 1295 and/or instructions executable by processing circuitry 1260. Software 1295 can include any type of software including software for instantiating one or more virtualization layers 1250 (also referred to as hypervisors), software to execute virtual machines 1240 as well as software allowing it to execute functions, features and/or benefits described in relation with some exemplary embodiments described herein.

Virtual machines 1240, comprise virtual processing, virtual memory, virtual networking or interface and virtual storage, and can be run by a corresponding virtualization layer 1250 or hypervisor. Different embodiments of the instance of virtual appliance 1220 can be implemented on one or more of virtual machines 1240, and the implementations can be made in different ways.

During operation, processing circuitry 1260 executes software 1295 to instantiate the hypervisor or virtualization layer 1250, which can sometimes be referred to as a virtual machine monitor (VMM). Virtualization layer 1250 can present a virtual operating platform that appears like networking hardware to virtual machine 1240.

As shown in FIG. 12, hardware 1230 can be a standalone network node with generic or specific components. Hardware 1230 can comprise antenna 12225 and can implement some functions via virtualization. Alternatively, hardware 1230 can be part of a larger cluster of hardware (e.g. such as in a data center or customer premise equipment (CPE))

where many hardware nodes work together and are managed via management and orchestration (MANO) 12100, which, among others, oversees lifecycle management of applications 1220.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1240 can be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some exemplary embodiments, one or more radio units 12200 that each include one or more transmitters 12220 and one or more receivers 12210 can be coupled to one or more antennas 12225. Radio units 12200 can communicate directly with hardware nodes 1230 via one or more appropriate network interfaces and can be used in combination with the virtual components to provide a virtual node with radio capabilities, such as a radio access node or a base station.

In some exemplary embodiments, some signalling can be effected with the use of control system 12230 which can alternatively be used for communication between the hardware nodes 1230 and radio units 12200.

With reference FIG. 11, in accordance with an embodiment, a communication system includes telecommunication network 1110, such as a 3GPP-type cellular network, which comprises access network 1111, such as a radio access network, and core network 1112. Access network 1111 comprises a plurality of base stations 1112a, 1112b, 1112c, such as NBs, eNBs, gNBs or other types of wireless access points, each defining a corresponding coverage area 1111a, 1111b, 1111c. Each base station 1112a, 1112b, 1112c is connectable to core network 1112 over a wired or wireless connection 1115. A first UE 1191 located in coverage area 1111c can be configured to wirelessly connect to, or be paged by, the corresponding base station 1112c. A second UE 1192 in coverage area 1111a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which can be embodied in the hardware and/or software of a standalone server, a cloud-implemented server, a distributed server or as processing resources in a server farm. Host computer 1130 can be under the ownership or control of a service provider, or can be operated by the service provider or on behalf of the service provider. Connections 1121 and 1122 between telecommunication network 1110 and host computer 1130 can extend directly from core network 1112 to host computer 1130 or can go via an optional intermediate network 1120. Intermediate network 1120 can be one of, or a combination of more than one of, a public, private or hosted network; intermediate network 1120, if any, can be a backbone network or the Internet; in particular, intermediate network 1120 can comprise two or more sub-networks (not shown).

The communication system of FIG. 11 as a whole enables connectivity between the connected UEs 1191, 1192 and host computer 1130. The connectivity can be described as an over-the-top (OTT) connection 1150. Host computer 1130 and the connected UEs 1191, 1192 are configured to communicate data and/or signaling via OTT connection 1150, using access network 1111, core network 1112, any intermediate network 1120 and possible further infrastructure (not shown) as intermediaries. OTT connection 1150 can be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which can have storage and/or processing capabilities. In particular, processing circuitry 1218 can comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 can be operable to provide a service to a remote user, such as UE 1230 connecting via OTT connection 1250 terminating at UE 1230 and host computer 1210. In providing the service to the remote user, host application 1212 can provide user data which is transmitted using OTT connection 1250.

Communication system 1200 can also include base station 1220 provided in a telecommunication system and comprising hardware 1225 enabling it to communicate with host computer 1210 and with UE 1230. Hardware 1225 can include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 can be configured to facilitate connection 1260 to host computer 1210. Connection 1260 can be direct or it can pass through a core network (not shown in FIG. 12) of the telecommunication system and/or through one or more intermediate networks outside the telecommunication system. In the embodiment shown, hardware 1225 of base station 1220 can also include processing circuitry 1228, which can comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 can also include UE 1230 already referred to. Its hardware 1235 can include radio interface 1237 configured to set up and maintain wireless connection 1270 with a base station serving a coverage area in which UE 1230 is currently located. Hardware 1235 of UE 1230 can also include processing circuitry 1238, which can comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 can be operable to provide a service to a human or non-human user via UE 1230, with the support of host computer 1210. In host computer 1210, an executing host application 1212 can communicate with the executing client application 1232 via OTT connection 1250 terminating at UE 1230 and host computer 1210. In providing the service to the user, client application 1232 can receive request data from host application 1212 and provide user data in response to the request data. OTT connection 1250 can transfer both the request data and the user data. Client application 1232 can interact with the user to generate the user data that it provides.

It is noted that host computer 1210, base station 1220 and UE 1230 illustrated in FIG. 12 can be similar or identical to host computer 1530, one of base stations 1512*a*, 1512*b*, 1512*c* and one of UEs 1591, 1592 of FIG. 15, respectively. This is to say, the inner workings of these entities can be as shown in FIG. 12 and independently, the surrounding network topology can be that of FIG. 15.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure can determine the routing, which it can be configured to hide from UE 1230 or from the service provider operating host computer 1210, or both. While OTT connection 1250 is active, the network infrastructure can further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the exemplary embodiments disclosed herein improve transmission and reception of sounding reference signals (SRS) that are used to acquire channel state information (CSI) for uplink and, optionally, downlink channels. Such CSI is essential for proper configuration of VL-MIMO solutions that are known to provide benefits including, but not limited to: increased data rate and/or throughput on downlink or uplink; increased coverage at a given data rate; reduced latency in transmission, reception, and/or processing of data; increased capacity in terms of the number of users in a geographic area who can access and/or utilize a particular service via the wireless network.

A measurement procedure can be provided for the purpose of monitoring data rate, latency and other network operational aspects on which the one or more embodiments improve. There can further be an optional network functionality for reconfiguring OTT connection 1250 between host computer 1210 and UE 1230, in response to variations in the measurement results. The measurement procedure and/or the network functionality for reconfiguring OTT connection 1250 can be implemented in software 1211 and hardware 1215 of host computer 1210 or in software 1231 and hardware 1235 of UE 1230, or both. In embodiments, sensors (not shown) can be deployed in or in association with communication devices through which OTT connection 1250 passes; the sensors can participate in the measurement procedure by supplying values of the monitored quantities exemplified above, or supplying values of other physical quantities from which software 1211, 1231 can compute or estimate the monitored quantities. The reconfiguring of OTT connection 1250 can include message format, retransmission settings, preferred routing etc.; the reconfiguring need not affect base station 1220, and it can be unknown or imperceptible to base station 1220. Such procedures and functionalities can be known and practiced in the art. In certain embodiments, measurements can involve proprietary UE signaling facilitating host computer 1210's measurements of throughput, propagation times, latency and the like. The measurements can be implemented in that software 1211 and 1231 causes messages to be transmitted, in particular empty or 'dummy' messages, using OTT connection 1250 while it monitors propagation times, errors etc.

FIG. 15 is a flowchart illustrating an exemplary method and/or procedure implemented in a communication system, in accordance with one embodiment. The communication system includes a host computer, a base station and a UE which, in some exemplary embodiments, can be those described with reference to FIGS. 12-15*d*. For simplicity of the present disclosure, only drawing references to FIG. 15 will be included in this section. In step 1510, the host computer provides user data. In substep 1511 (which can be optional) of step 1510, the host computer provides the user data by executing a host application. In step 1520, the host computer initiates a transmission carrying the user data to the UE. In step 1530 (which can be optional), the base station transmits to the UE the user data which was carried in the transmission that the host computer initiated, in accordance with the teachings of the embodiments described throughout this disclosure. In step 1540 (which can also be optional), the UE executes a client application associated with the host application executed by the host computer.

FIG. 16 is a flowchart illustrating an exemplary method and/or procedure implemented in a communication system, in accordance with one embodiment. The communication system includes a host computer, a base station and a UE which can be those described with reference to FIGS. 12-16. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission can pass via the base station, in accordance with the teachings of the embodiments described throughout this disclosure. In step 1630 (which can be optional), the UE receives the user data carried in the transmission.

Figures 17, 18:
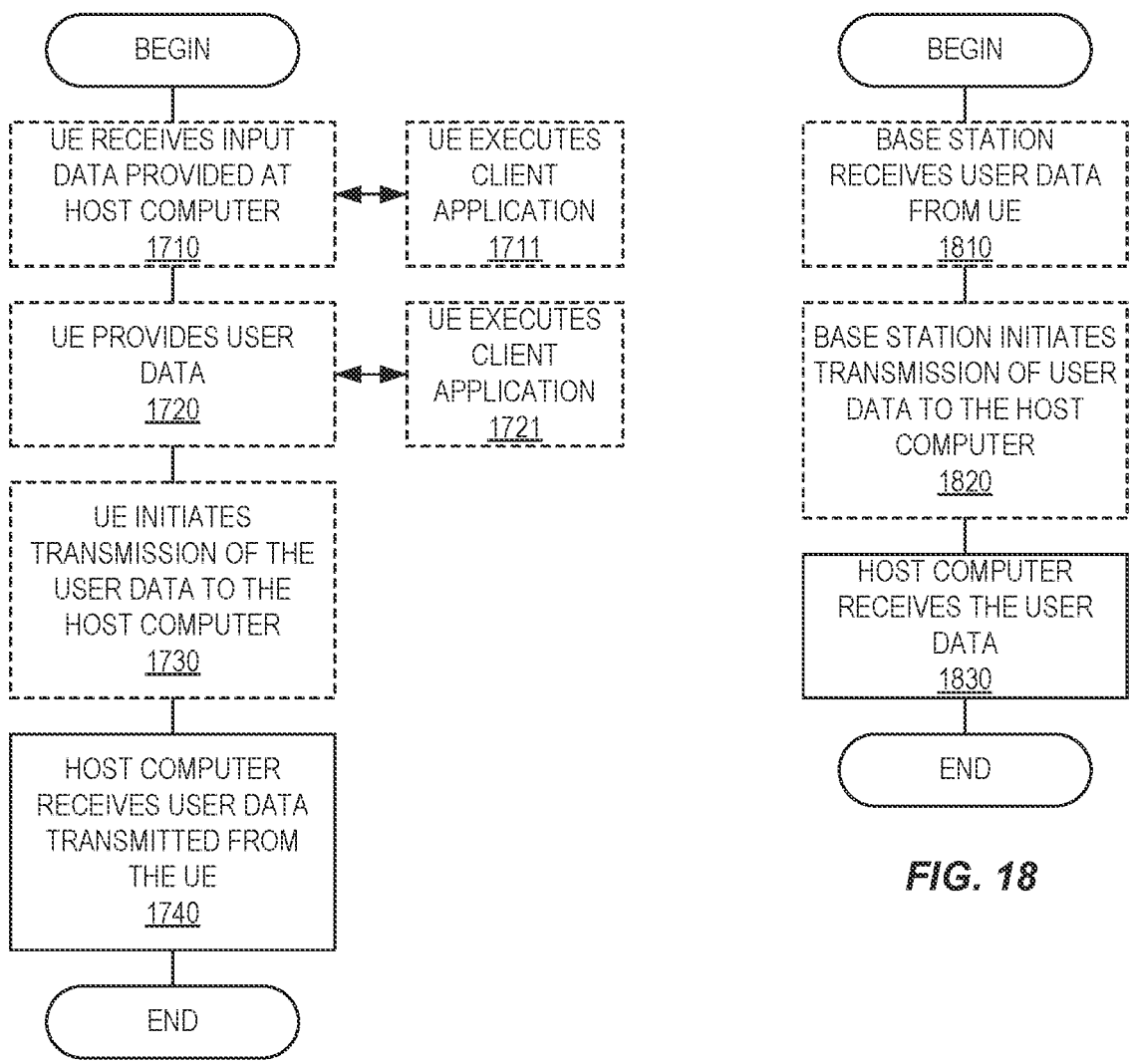

FIG. 17 is a flowchart illustrating an exemplary method and/or procedure implemented in a communication system, in accordance with one embodiment. The communication system includes a host computer, a base station and a UE which can be those described with reference to FIGS. 10-12. For simplicity of the present disclosure, only drawing references to FIG. 17 will be included in this section. In step 1710 (which can be optional), the UE receives input data provided by the host computer. Additionally or alternatively, in step 1720, the UE provides user data. In substep 1721 (which can be optional) of step 1720, the UE provides the user data by executing a client application. In substep 1711 (which can be optional) of step 1710, the UE executes a client application which provides the user data in reaction to the received input data provided by the host computer. In providing the user data, the executed client application can further consider user input received from the user. Regardless of the specific manner in which the user data was provided, the UE initiates, in substep 1730 (which can be optional), transmission of the user data to the host computer. In step 1740 of the method, the host computer receives the user data transmitted from the UE, in accordance with the teachings of the embodiments described throughout this disclosure.

FIG. 18 is a flowchart illustrating an exemplary method and/or procedure implemented in a communication system, in accordance with one embodiment. The communication system includes a host computer, a base station and a UE which can be those described with reference to FIGS. 10-12. For simplicity of the present disclosure, only drawing references to FIG. 18 will be included in this section. In step 1810 (which can be optional), in accordance with the teachings of the embodiments described throughout this disclosure, the base station receives user data from the UE. In step 1820 (which can be optional), the base station initiates transmission of the received user data to the host computer. In step 1830 (which can be optional), the host computer receives the user data carried in the transmission initiated by the base station.

The term unit can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

Clauses

1. A method performed by a V2X application enabler (VAE) client, of a V2X user equipment (UE), in communication with a VAE server, the method comprising:

Sending, to the VAE server, a first message comprising an identifier of the V2X UE and at least one of the following:
  i. identifiers of one or more first types of intelligent transportation system (ITS) messages, from the VAE server, to which the V2X UE wishes to register or unregister for receiving;
  ii. an identifier of a first geographic area that V2X UE wishes to register or unregister for association with the V2X UE at the VAE server;

receiving, from the VAE server, a second message indicating acknowledgement of a registration or an unregistration action requested in the first message.

2. The method of clause 1, wherein the first message comprises the identifier of the first geographic area and identifiers of the first types of ITS messages that the V2X UE wishes to register for receiving with respect to the first geographic area.

3. The method of any of clauses 1-2, further comprising receiving, from the VAE server, an ITS message corresponding to one of the first types of ITS messages to which the V2X client registered to receive.

4. The method of clause 3, wherein the ITS message is associated with the first geographic area.

5. The method of any of clauses 2-4, further comprising sending, to the VAE server, a third message comprising an identifier of a second geographic area and identifiers of one or more second types of ITS messages that the V2X UE wishes to register for receiving with respect to the second geographic area.

6. The method of clause 5, further comprising receiving, from the VAE server, a fourth message indicating acknowledgement of the registration action identified in the third message.

7. The method of clauses 2-5, further comprising sending, to the VAE server, a fifth message comprising an identifier of the first geographic area and identifiers of the first types of ITS messages that the V2X UE wishes to unregister for receiving with respect to the first geographic area.

8. The method of clause 7, further comprising receiving, from the VAE server, a sixth message indicating acknowledgement of the unregistration action identified in the fifth message.

9. The method of any of clauses 5-6, wherein at least one of the first types of messages is not included in the second types of messages.

10. A method performed by a V2X application enabler (VAE) server in communication with of a VAE client of a user equipment (UE), the method comprising:
receiving, from the VAE client, a first message comprising an identifier of the V2X UE and at least one of the following:
  i. identifiers of one or more first types of intelligent transportation system (ITS) messages, from the VAE server, to which the V2X UE wishes to register or unregister for receiving;
  ii. an identifier of a first geographic area that V2X UE wishes to register or unregister for association with the V2X UE at the VAE server;
performing a registration or an unregistration action identified in the first message; and
sending, to the VAE client, a second message indicating acknowledgement of the registration or unregistration action.

11. The method of clause 10, wherein the first message comprises the identifier of the first geographic area and identifiers of the first types of ITS messages that the V2X UE wishes to register for receiving with respect to the first geographic area.

12. The method of any of clauses 10-11, further comprising sending, to the VAE client, an ITS message corresponding to one of the first types of ITS messages to which the V2X client registered to receive.

13. The method of clause 12, further comprising, prior to sending the ITS message:
Receiving the ITS message from an V2X application-specific server, wherein the ITS message is associated with the following: a geographic region comprising the first geographic area, and one of the first types of ITS messages; and
Based on the V2X UE registration, identifying the V2X UE as a target for the ITS message.

14. The method of any of clauses 11-13, further comprising receiving, from the VAE client, a third message comprising an identifier of a second geographic area and identifiers of one or more second types of ITS messages that the V2X UE wishes to register for receiving with respect to the second geographic area.

15. The method of clause 14, wherein at least one of the first types of messages is not included in the second types of messages.

16. The method of any of clauses 14-15, further comprising:
performing the registration identified in the third message; and
sending, to the VAE client, a fourth message indicating acknowledgement of the registration identified in the third message.

17. The method of clauses 11-16, further comprising receiving, from the VAE client, a fifth message comprising an identifier of the first geographic area and identifiers of the first types of ITS messages that the V2X UE wishes to unregister for receiving with respect to the first geographic area.

18. The method of clause 17, further comprising:
performing the registration identified in the fifth message; and
sending, to the VAE client, a sixth message indicating acknowledgement of the unregistration identified in the fifth message.

19. A wireless device comprising:
processing circuitry configured to perform operations corresponding to any of the methods of clauses 1-9; and
power supply circuitry configured to supply power to the wireless device.

20. An application server comprising:
processing circuitry configured to perform operations corresponding to any of the methods of clauses 10-18;
power supply circuitry configured to supply power to the application server.

21. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform operations corresponding to any of the methods of clauses 1-9;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

22. A communication system, including:
a host computer comprising:
processing circuitry configured to provide user data; and
a communication interface configured to forward the user data to a cellular network for transmission to a user equipment (UE);
a base station having a radio interface and processing circuitry configured to communicate with the UE; and
a UE comprising processing circuitry configured to perform operations corresponding to any of the methods of clauses 1-9.

23. The communication system of clause 22, wherein:
the processing circuitry of the host computer is configured to execute a host application, thereby providing the user data; and
the UE comprises processing circuitry configured to execute a client application associated with the host application.

24. The communication system of any of clauses 22-23, wherein the host computer comprises a V2X application enabler (VAE) server comprising processing circuitry configured to perform operations corresponding to any of clauses 10-18.

25. A method implemented in a communication system including a host computer, a base station and a user equipment (UE), the method comprising:
at the host computer, providing user data; and
at the host computer, initiating a transmission carrying the user data to the UE via a cellular network comprising the base station;
at the UE, performing operations corresponding to any of clauses 1-9.

26. The method of clause 25, further comprising, at the base station, transmitting the user data.

27. The method of any of clauses 25-26, wherein the user data is provided at the host computer by executing a host application, the method further comprising, at the UE, executing a client application associated with the host application.

28. The method of any of clauses 25-27, further comprising, at the host computer, performing operations corresponding to any of clauses 10-18.

29. A communication system including:
a host computer comprising communication interface configured to receive user data originating from a transmission from a user equipment (UE) to a base station
a UE comprising a radio interface and processing circuitry, the UE's processing circuitry configured to perform operations corresponding to any of the methods of clauses 1-9.

30. The communication system of clause 29, further including the base station, wherein the base station comprises a radio interface configured to communicate with the UE and a communication interface configured to forward to the host computer the user data carried by a transmission from the UE to the base station.

31. The communication system of any of clauses 29-30, wherein:
the processing circuitry of the host computer is configured to execute a host application; and the UE's processing circuitry is configured to execute a client application associated with the host application, thereby providing the user data.

32. The communication system of any of clauses 29-31, wherein:
    the processing circuitry of the host computer is configured to execute a host application, thereby providing request data; and
    the UE's processing circuitry is configured to execute a client application associated with the host application, thereby providing the user data in response to the request data.

33. The communication system of any of clauses 29-32, wherein the host computer comprises a V2X application enabler (VAE) server comprising processing circuitry configured to perform operations corresponding to any of clauses 10-18.

34. A method implemented in a communication system including a host computer, a base station and a user equipment (UE), the method comprising: at the host computer, receiving user data transmitted to the base station from the UE, wherein the UE performs operations corresponding to any of the methods of clauses 1-9.

35. The method of clause 34, further comprising, at the UE, providing the user data to the base station.

36. The method of any of clauses 34-35, further comprising:
    at the UE, executing a client application, thereby providing the user data to be transmitted; and
    at the host computer, executing a host application associated with the client application.

37. The method of any of clauses 34-36, further comprising:
    at the UE, executing a client application; and
    at the UE, receiving input data to the client application, the input data being provided at the host computer by executing a host application associated with the client application,
    wherein the user data to be transmitted is provided by the client application in response to the input data.

38. A method implemented in a communication system including a host computer, a base station and a user equipment (UE), the method comprising:
    at the host computer, receiving, from the base station, user data originating from a transmission which the base station has received from the UE, clauses the UE performs operations corresponding to any of the methods of clauses 1-9.

39. The method of clause 38, further comprising at the base station, receiving the user data from the UE.

40. The method of any of clauses 38-39, further comprising at the base station, initiating a transmission of the received user data to the host computer.

The invention claimed is:

1. A method performed by a V2X application enabler (VAE) client, of a V2X User Equipment (UE) arranged for communication with a VAE server, the method comprising:
    sending, to the VAE server, a first request for registration or de-registration to receive intelligent transportation system (ITS) messages associated with at least one of the following:
        a first V2X service, when an identifier of the first V2X service is included in the first request; and
        a first geographic area, when an identifier of the first geographic area is included in the first request; and
    receiving, from the VAE server, a first response comprising an acknowledgement of the first request for registration or de-registration.

2. The method of claim 1, wherein:
    the first request includes an identifier of the V2X UE, and
    the first response does not include the identifier of the V2X UE.

3. The method of claim 1, wherein the first request includes the identifier of the first geographic area and the identifier of the first V2X service, indicating registration or de-registration to receive ITS messages associated with the first V2X service in the first geographic area.

4. The method of claim 1, wherein:
    the first request is a first registration request; and
    the method further comprises receiving, from the VAE server, one or more ITS messages associated with at least one of the first V2X service and the first geographic area, as indicated in the first registration request.

5. The method of claim 1, further comprising:
    sending, to the VAE server, a second request for registration or de-registration to receive ITS messages associated with at least one of the following:
        a second V2X service, when an identifier of the second V2X service is included in the second request; and
        a second geographic area, when an identifier of the second geographic area is included in the second request; and
    receiving, from the VAE server, a second response comprising an acknowledgement of the second request for registration or de-registration.

6. The method of claim 5, wherein:
    the first request is for registration to receive ITS messages;
    the second request is for de-registration to receive ITS messages; and
    identifiers of one or more of the following are included in both the first and second requests: a same V2X service and a same geographic area.

7. The method of claim 5, wherein:
    the first request is for registration to receive ITS messages;
    the second request is for registration to receive ITS messages; and
    the second request includes at least one of the following:
        an identifier of a V2X service that is not included in the first request; and
        an identifier of a geographic area that is not included in the first request.

8. A V2X User Equipment (UE) comprising:
    communication interface circuitry configured to communicate with a V2X application enabler (VAE) server; and
    processing circuitry operably coupled with the communication interface circuitry, whereby the processing circuitry and the communication interface circuitry are configured to perform VAE client operations corresponding to the method of claim 1.

9. The V2X UE of claim 8, wherein:
    the first request includes an identifier of the V2X UE, and
    the first response does not include the identifier of the V2X UE.

10. The V2X UE of claim 8, wherein:
    the first request is a first registration request; and
    the processing circuitry and the communication interface circuitry are further configured to receive, from the VAE server, one or more ITS messages associated with at least one of the first V2X service and the first geographic area, as indicated in the first registration request.

11. A method performed by a V2X application enabler (VAE) server in communication with a VAE client of a User Equipment (UE) the method comprising:
- receiving, from the VAE client, a first request for registration or de-registration to receive intelligent transportation system (ITS) messages associated with at least one of the following:
  - a first V2X service, when an identifier of the first V2X service is included in the first request; and
  - a first geographic area, when an identifier of the first geographic area is included in the first request;
- performing a registration or a de-registration of the VAE client to receive ITS messages according to the first request; and
- sending, to the VAE client, a first response comprising an acknowledgement of the first request for registration or de-registration.

12. The method of claim 11, wherein:
the first request includes an identifier of the V2X UE, and the first response does not include the identifier of the V2X UE.

13. The method of claim 11, wherein the first request includes the identifier of the first geographic area and the identifier of the first V2X service, indicating registration or de-registration to receive ITS messages associated with the first V2X service in the first geographic area.

14. The method of claim 11, wherein:
the first request is a first registration request; and
the method further comprises sending, to the VAE client, one or more ITS messages associated with at least one of the first V2X service and the first geographic area, as indicated in the first registration request.

15. The method of claim 11, further comprising:
- receiving, from the VAE client, a second request for registration or de-registration to receive ITS messages associated with at least one of the following:
  - a second V2X service, when an identifier of the second V2X service is included in the second request; and
  - a second geographic area, when an identifier of the second geographic area is included in the second request;
- performing a registration or a de-registration of the VAE client to receive ITS messages according to the second request; and
- sending, to the VAE client, a second response comprising an acknowledgement of the second request for registration or de-registration.

16. The method of claim 15, wherein:
the first request is for registration to receive ITS messages;
the second request is for de-registration to receive ITS messages; and
identifiers of one or more of the following are included in both the first and second requests: a same V2X service and a same geographic area.

17. The method of claim 16, wherein:
the first request is for registration to receive ITS messages;
the second request is for registration to receive ITS messages; and
the second request includes at least one of the following:
- an identifier of a V2X service that is not included in the first request; and
- an identifier of a geographic area that is not included in the first request.

18. A V2X application enabler (VAE) server comprising:
communication interface circuitry configured to communicate with a VAE client of a V2X User Equipment (UE); and
processing circuitry operably coupled with the communication interface circuitry, whereby the processing circuitry and the communication interface circuitry are configured to perform operations corresponding to the method of claim 11.

19. The VAE server of claim 18, wherein:
the first request includes an identifier of the V2X UE, and the first response does not include the identifier of the V2X UE.

20. The VAE server of claim 18, wherein:
the first request is a first registration request; and
the processing circuitry and the communication interface circuitry are further configured to send, to the VAE client, one or more ITS messages associated with at least one of the first V2X service and the first geographic area, as indicated in the first registration request.

* * * * *

UNITED STATES PATENT AND TRADEMARK OFFICE
CERTIFICATE OF CORRECTION

PATENT NO. : 12,143,905 B2  
APPLICATION NO. : 17/236153  
DATED : November 12, 2024  
INVENTOR(S) : el Essaili et al.

It is certified that error appears in the above-identified patent and that said Letters Patent is hereby corrected as shown below:

In the Specification

In Column 1, Line 10, delete "2019," and insert -- 2019, now U.S. Pat. No. 11,012,834, --, therefor.

In Column 1, Line 65, delete "Standard" and insert -- Specification --, therefor.

In Column 2, Line 38, delete "Evovled Packet Subsystem (EPS) and/or 5G subsystem" and insert -- Evolved Packet System (EPS) and/or 5G system --, therefor.

In Column 5, Line 6, delete "equipped" and insert -- equipment --, therefor.

In Column 29, Line 16, delete "substep 1730" and insert -- step 1730 --, therefor.

Signed and Sealed this  
Fifteenth Day of April, 2025

Coke Morgan Stewart  
*Acting Director of the United States Patent and Trademark Office*